US011252045B1

United States Patent
Moinuddin et al.

(10) Patent No.: US 11,252,045 B1
(45) Date of Patent: Feb. 15, 2022

(54) PROCESSING BLIND BEAMFORMING FOR MULTI-USER MULTIPLE-INPUT MULTIPLE-OUTPUT (MU-MIMO) SYSTEMS

(71) Applicant: King Abdulaziz University, Jeddah (SA)

(72) Inventors: Muhammad Moinuddin, Jeddah (SA); Ubaid M. Al-Saggaf, Jeddah (SA); Ahmad Kamal Hassan, Khyber Pakhtunkhwa (PK)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/503,440

(22) Filed: Oct. 18, 2021

(51) Int. Cl.
*H04B 7/06* (2006.01)
*H04L 12/24* (2006.01)
*H04B 7/0452* (2017.01)

(52) U.S. Cl.
CPC ......... *H04L 41/147* (2013.01); *H04B 7/0452* (2013.01); *H04B 7/0617* (2013.01); *H04L 41/0654* (2013.01)

(58) Field of Classification Search
None
See application file for complete search history.

(56) References Cited

U.S. PATENT DOCUMENTS

| 6,694,155 | B1 | 2/2004 | Chin et al. |
| 10,895,635 | B1 * | 1/2021 | Al-Saggaf ............... G01S 13/42 |

(Continued)

FOREIGN PATENT DOCUMENTS

| CN | 110149127 A | 8/2019 | |
| KR | 1284935 B1 | 7/2013 | |
| WO | WO-2018059691 A * | 4/2018 | ........... H04B 7/0617 |

OTHER PUBLICATIONS

A. K. Hassan, M. Moinuddin, U. M. Al-Saggaf, O. Aldayel, T. N. Davidson and T. Y. Al-Naffouri, "Performance Analysis and Joint Statistical Beamformer Design for Multi-User MIMO Systems," in IEEE Communications Letters, vol. 24, No. 10, pp. 2152-2156, Oct. 2020, doi: 10.1109/LCOMM.2020.3001556. (Year: 2020).*

(Continued)

*Primary Examiner* — Brian S Roberts
(74) *Attorney, Agent, or Firm* — Oblon, McClelland, Maier & Neustadt, L.L.P.

(57) ABSTRACT

A wireless network system includes a base station (BS) having a number of array antennas and a controller. The network system also includes a number of mobile stations (MS) each having its own antenna array. The base station modulates a transmit signal directed to a MS with a transmit beamformer as specified by the controller. The MS equalizes a received signal with a receive beamformer. The controller is configured to calculate an outage probability of the MS based on statistical channel state information at the BS, for a given set of a transmit beamformer $w_k$, a receive beamformer $v_k$, and a predetermined threshold of a signal-to-noise-interference-plus-noise ratio (SINR) at the MS. The controller is also configured to obtain a solution set comprising a transmit beamformer $w_k$ and a receive beamformer $v_k$. The controller is further configured to specify, based on the obtained solution set, the beamformers to be adopted.

20 Claims, 16 Drawing Sheets

(56) References Cited

U.S. PATENT DOCUMENTS

2006/0285606 A1* 12/2006 Khojastepour ..... H04W 52/346
375/267
2019/0132050 A1* 5/2019 Salhab ............... H04B 10/1129

OTHER PUBLICATIONS

A. K. Hassan, M. Moinuddin, U. M. Al-Saggaf and T. Y. Al-Naffouri, "Performance Analysis of Beamforming in MU-MIMO Systems for Rayleigh Fading Channels," in IEEE Access, vol. 5, pp. 3709-3720, 2017, doi: 10.1109/ACCESS.2017.2682791. (Year: 2017).*
Li You et al.; "Outage Constrained Robust Multigroup Multicast Beamforming for Multi-Beam Satellite Communication Systems", National Mobile Communications Research Laboratory; Wireless Communications Letters, vol. 8, No. 2 Apr. 2019.

* cited by examiner

PROCESSING BLIND BEAMFORMING FOR MULTI-USER MULTIPLE-INPUT MULTIPLE-OUTPUT (MU-MIMO) SYSTEMS

BACKGROUND

Technical Field

The present disclosure is directed to telecommunication systems and methods, and more specifically to improved methods of minimizing outage probabilities of multiple system users through beamforming solutions in multi-user multiple-input, multiple-output (MIMO) systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In wireless telecommunications, antenna arrays are used by both base stations (BSs) and mobile stations (MSs) to enable diversity gain and improve performance indicators (e.g., outage probability and/or spectral efficiency of a wireless communication system). To utilize well-known spatial diversity based beamforming solutions such as Zero-Forcing, Maximum Ratio Combining, and the like, most existing methods require information for instantaneous channel state information (CSI) at both the BS and MSs. These models rely on difficult-to-obtain and bandwidth-intensive CSI, which require sending pilot signals. In addition to those drawbacks, these algorithms can also burden computing resources with high computation complexity for accurate estimation. As an alternative, statistical CSI based downlink systems save bandwidth, but require second order statistics of a BS.

In previous techniques statistical CSI-based formulation was considered to achieve a closed-form expression of outage probability, along with techniques of minimizing the outage probability of a MIMO radar system. These known approaches also used an indefinite quadratic formulation for the characterization of outage probability. However, the system model and area to which those solutions were applied are incomplete. Conventional solutions describe analyzing incident waveforms transmitted from the MIMO radar towards an unknown target. Analyzing reflected waveforms reflected from the unknown target to the MIMO radar in order to reduce the outage probability associated with the MIMO radar has been used. However, a downlink MU-MIMO system model in terms of a signal-to-interference-plus-noise (SINR) has not been considered, relevant closed-form expressions have not been given, and algorithms which reduce the outage probability have not been included.

U.S. Pat. No. 7,702,304 discloses an adaptive beamforming-based receiver employing maximal ratio combining (MRC) and an interference nulling algorithm (INA), the entire contents of which are incorporated herein by reference. U.S. Pat. No. 7,949,360 describes considering a single receive antenna-based beamforming solution for an adaptive transmit power coupled with orthogonal space time block codes (OSTBC), the entire contents of which are incorporated herein by reference. However, the system model and applications in those references were different than those considered for use in an MU-MIMO system. Characterization of outage probability and statistical joint beamforming were not considered. Moreover, no method of obtaining the closed-form expression of outage probability of a given MS in a multi-MS case was given for the statistical CSI case.

Hassan et al. ("Performance Analysis and Joint Statistical Beamformer Design for Multi-User MIMO Systems," IEEE Communications Letters, 2020, hereinafter referred to as "Hassan I", the entire contents of which are incorporated herein by reference) describe an indefinite quadratic formulation used to characterize the outage probability of MU-MIMO system, wherein the system model is based on covariance shaping. The covariance shaping model is used in projecting the signals to the MSs in orthogonal subspaces in order to reduce the co-channel interference. However, the receive beamforming utilizes only covariance shaping. The transmit beamforming is based on a sub-optimum solution by minimizing Signal-to-Leakage-Noise Ratio (SLNR).

Ahmed et al. ("Mitigation of self-interference and multi-user interference in downlink multi-user MIMO system," IET Communications, 11(17), pp. 2605-2612, (2017), the entire contents of which are incorporated herein by reference) also disclose an indefinite quadratic formulation used to characterize the outage probability of MU-MIMO systems. The system model described in Ahmed also includes self-interference. The outage probability expression in Ahmed was later used to define a linear-scalarized objective function. That approach does not impose any constraint of unbiased service for all mobile stations in the system and a given user may achieve improved performance, albeit, at the cost of degraded performance for other users. Moreover, Ahmed did not consider the multi-objective minimization problem in which the outage probability of each user is considered as an independent objective.

Al-Naffouri et al. ("On the distribution of indefinite quadratic forms in Gaussian random variables," IEEE Transactions on Communications, 64(1), pp. 153-165, 2015) and a second investigation by Hassan et al. ("Performance analysis of beamforming in MU-MIMO systems for Rayleigh fading channels," IEEE Access, 5, pp. 3709-3720, 2017, hereinafter "Hassan II", the entire contents of both are incorporated herein by reference) describe considering a single receive antenna downlink MU-MIMO and provide an expression of outage probability. However, multi-antenna user equipment was not considered. Also, these references failed to give a method of transforming a Kronecker-structured channel model into a canonical quadratic form useful for indefinite quadratic formulation.

Weichselberger et al. ("A stochastic MIMO channel model with joint correlation of both link ends," IEEE Transactions on wireless Communications, 5(1), pp. 90-100, 2006, the entire contents of which are incorporated herein by reference) describes separating transmit and receive correlation matrices from the channel matrix in a Kronecker-structured channel model. However, Weichselberger does not provide an exact characterization of an outage probability using an indefinite quadratic formulation for a canonical quadratic form of SINR adopted from the Kronecker-structured channel model. Mursia, et al. ("Covariance shaping for massive MIMO systems," IEEE Global Communications Conference (GLOBECOM), December pp. 1-6, 2018, the entire contents of which are incorporated herein by reference) discloses leveraging aspects of spatial diversity to shape the channel covariance matrix for a multi-antenna receiver system. Mursia's approach addresses problems encountered by algorithms serving close-proximity MSs.

However, it does not provide an exact characterization of outage probability or provide simultaneous transmit and receive blind beamforming.

Each of the aforementioned systems and methods suffers from one or more drawbacks hindering their adoption, such as failing to provide linear-scalarized solutions, joint transmit and receive beamforming techniques, and multi-objective based joint statistical beamforming solutions. Accordingly, it is one object of the present disclosure to provide methods and systems capable of calculating a Kronecker-structured channel model which is transformed into a canonical quadratic form, i.e., one enabling the mathematical tractability of achieving an exact closed-form expression of outage probability. Another aspect of the present application is setting the outage probability as an objective function in either a linear-scalarized, or a multi-objective form, so as to improve the performance of a given user without adversely affecting other users in the network. It is also a goal to achieve this without unnecessarily taxing the bandwidth of the system with pilot signaling and instantaneous CSI measurement.

SUMMARY

In an exemplary embodiment, a multiple-input and multiple-output (MIMO) wireless network system includes a base station (BS), a plurality number (K) of mobile stations (MSs) and a controller. The BS further includes a plurality number (N) of antenna elements configured as an array antenna of the BS. Each of the MSs includes its own plurality number (M) of antenna elements configured as an array antenna of the MS. The controller includes a processor and a memory with a preinstalled program. The BS is configured to modulate a transmit signal (denoted "$s_k$") directed to a $k^{th}$ MS with a transmit beamformer (represented as "$w_k$") as specified by the controller. The $k^{th}$ MS is configured to equalize a received signal with a receive beamformer (denoted "$v_k$"). The controller is configured to control an operation of the MIMO wireless network system. The controller is further configured to: 1) adopt a definition of a function comprising an outage probability $P_k(w_k, v_k, \gamma)$ at a $k^{th}$ MS; 2) adopt a formulation of problem of minimizing the function; 3) find a solution set to the problem of minimizing the function (for example minimizing the beamformer $w_k$ beamformer $v_k$ variable), the solution set comprising a transmit beamformer $w_k$ and a receive beamformer $v_k$ (k=1 to K); and 4) specify based on the solution set, the transmit beamformer $w_k$ and the receive beamformer $v_k$ to be adopted at the BS and at the $k^{th}$ MS (k=1 to K), respectively. The outage probability is defined with the transmit beamformer $w_k$ and the receive beamformer $v_k$ and with a predetermined threshold $\gamma$ of a signal-to-interference-plus-noise ratio (SINR) at the MS (for example such that beamformer $w_k$ and beamformer $v_k$ are treated as minimizing variables). The formulation of a problem includes a predetermined precision level, an identification of minimizing variable(s) and a constraint, the constraint comprises a sum of the norms of the transit beamformer $$\sum_{k=1}^{K} \|w_k\|_2^2$$

being not greater than 1. The controller is further configured to calculate the outage probability in finding the solution set utilizing a closed form expression of the outage probability, the closed form expression derived based on a Kronecker-structured channel model.

In some embodiments, the controller is further configured to calculate the outage probability of the $k^{th}$ MS with equations including a unit step function and an eigenvalue of Hermitian matrices involving Kronecker matrix products. In certain embodiments, the calculations are formulated as a minimization problem of a weighted sum of the outage probabilities under constraints normalizing the total power consumption.

In some embodiments, obtaining the solution set includes adopting a direct multi-objective simultaneous minimization method (DMSM). In certain embodiments, obtaining the solution set includes performing a block-coordinate descent minimization (BCDM) technique. In other embodiments, a direct utility function minimization (DUFM) approach can be used to obtain the solution set.

In some embodiments, obtaining the solution set further includes adopting a successive approximation method (SAM). In certain embodiments, the SAM further includes setting a precision level and an algorithm, initializing an iteration index (i), initializing transmit and receive beamformers, and estimating initial values of the outage probabilities of the $k^{th}$ MS. In certain embodiments, the method iteratively adopts a minimization problem of a weighted sum of the outage probabilities with either one of the transmit beamformers or the receive beamformers as minimizing variables, updating the either one of the transmit beamformers or the receive beamformers when a reduction from a previous step is not smaller than the precision level. In certain embodiments, the algorithm of the SAM is selected from options including an active set algorithm, a sequential quadratic programming algorithm, or an interior point algorithm.

In another exemplary embodiment, a method of controlling a MIMO wireless network system includes 1) defining a function comprising an outage probability $P_k(w_k, v_k, \gamma)$ at a $k^{th}$ MS (k=1, 2, . . . , or K), 2) formulating a problem of minimizing the function, 3) finding a solution set to the problem of minimizing the function, 4) specifying by the controller based on the solution set, the transmit beamformer $w_k$ and the receive beamformer $v_k$ to be adopted at the BS and at the $k^{th}$ MS (k=1 to K), respectively. The method includes calculating the outage probability utilizing a closed form expression of the outage probability, the closed form expression derived based on a Kronecker-structured channel model.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
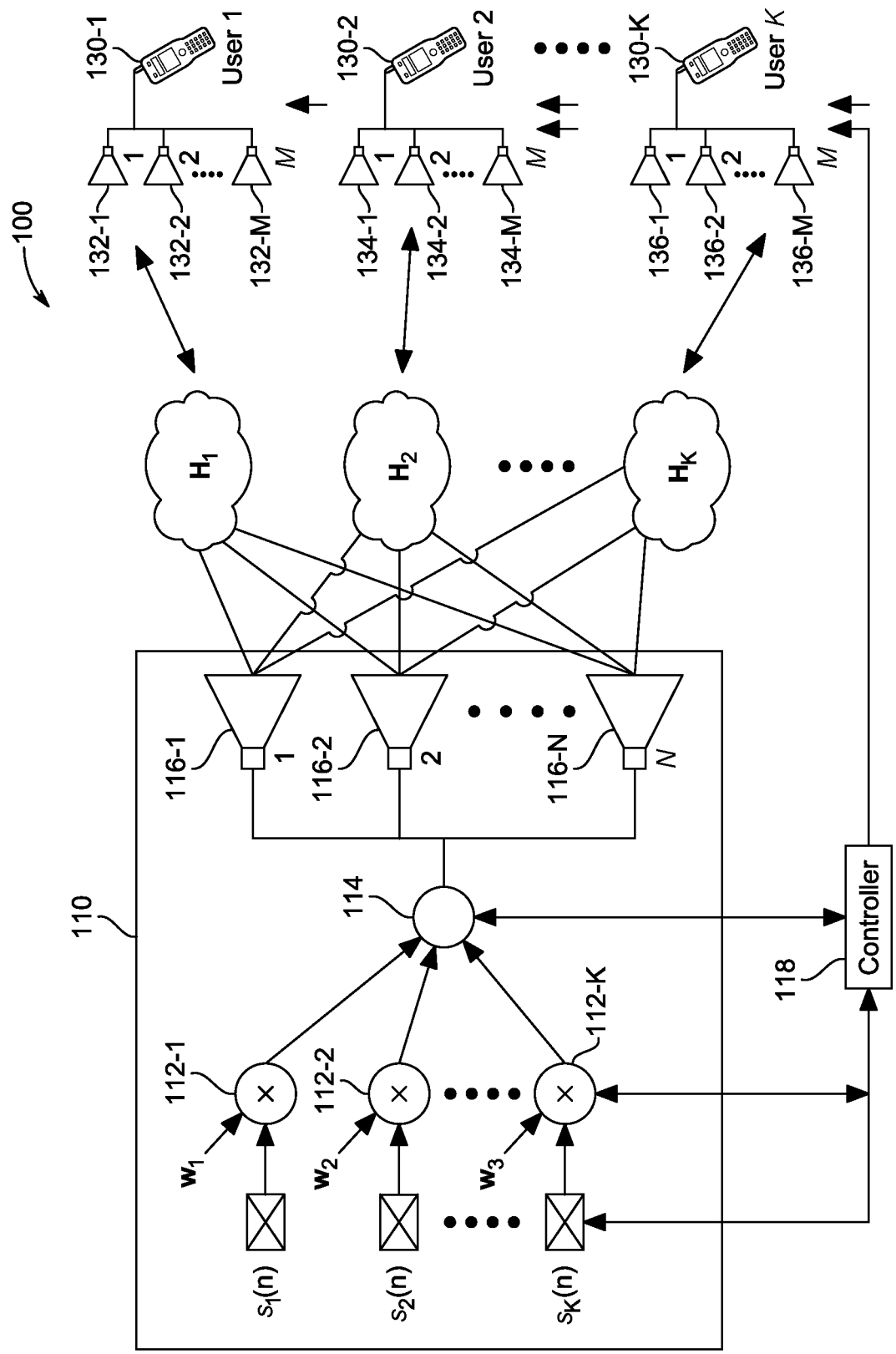
FIG. 1 is a schematic diagram of a multi-user, multiple-input, multiple-output (MU-MIMO) wireless network system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

According to embodiments, methods of beamforming in a downlink multi-user, multiple-input, multiple-output (MU-MIMO) system are provided. Embodiments involve joint transmit and receive blind beamforming, and each is based on the minimization of multi-user outage probability. In order to implement this, the outage probability is first characterized in closed form using an indefinite quadratic forms approach. Multiple methods for blind beamformer design of MU-MIMO transceivers are then developed as described below that utilize either minimization of the linear-scalarized objective function or the multi-objective criteria. The present application uses these approaches, so as to improve the performance of a given user without adversely affecting other users in the network. The disclosed beamforming solutions do not require sending pilot signals for channel state estimation and, thus, are bandwidth efficient. In addition, the beamforming methods of the instant application provide unbiased quality of service (QoS) by imposing appropriate constraints in the minimization task.

In this work, a Kronecker-structured channel model is considered which is transformed into a canonical quadratic form, enabling the feasibility of achieving an exact closed-form expression of outage probability. Consequently, several transmit and receive beamforming algorithms are provided which are useful in reducing the outage probability for a given MS without affecting the service of other users. Network models in which the BS has only statistical CSI are employed to ensure higher spectral efficiency while obtaining the closed-form expression of outage probability for the MU-MIMO system. Embodiments disclosed in the present application are based on downlink MU-MIMO systems in which statistical channel state information (CSI) at the transmitter side is considered. With that basis, a Rayleigh fading channel is assumed to indicate no direct link between the transmitter and receiver.

Turning to FIG. 1, a multi-user, multiple-input, multiple-output (MU-MIMO) system 100 is depicted. The MU-MIMO system 100 includes a base station (BS) 110 having a series of multipliers 112 (e.g., 112-1 to 112-$k$), an adder 114, and an array antenna of the BS 116 including a plurality number N of antenna elements 116-1 to 116-N. The base station 110 is configured to transmit data symbols to a plurality number K of multiple mobile stations (MSs) of users, denoted as 130-1 through 130-K, in a downlink direction. Each of the MSs includes an array antenna of the MS with a plurality number M of antenna elements 132-1 to 132-M. While FIG. 1 shows three mobile stations, one of skill in the relevant arts will understand that more MSs can be used in the MU-MIMO system 100, and thus the generic reference to MS 130-K as the last in the set, regardless of the total number of MSs.

The MU-MIMO system 100 also includes a controller 118, which is configured to communicate with various components of the system. As shown in FIG. 1, the controller 118 is in communication with the multipliers 112, the adder 114, and the MSs 130-1 through 130-M. The controller 118 is also configured to receive the data symbols, each generically denoted as $s_k(n)$, which are also received by the multipliers 112. Generally, "s" is the vector containing input signal for all K users. Accordingly, "s" is a vector containing input signals for users 1 through K, which can be represented as $s=[s_1, \ldots, s_K]^T$. The signals in "s" are independent and identically distributed with unit energy (i.e., $\mathbb{E}\{|s_k|^2\}=1$). The controller 118 is also configured to receive computational results from the multipliers 112 and/or the adder 114.

A variable W represents a precoding matrix for secure communication in system 100. When considering the plurality number N of the antenna elements of the array antenna of the BS and K users, W is an N by K matrix. The controller 118 is also configured to coordinate the modulation of each data symbol $s_k(n)$ with a transmit beamformer represented as $w_1$ through $w_K$, the design of which is described in greater detail above and below. The results of modulating the data symbols with the precoding matrix by the multipliers 112 are then available to the adder 114 as well as the controller 118. As depicted in FIG. 1, the channel matrix for MS 130-1 is denoted as $H_1$, the channel matrix for 130-2 as $H_2$, and so forth through channel matrix $H_K$ for MS 130-K.

Each of the antenna elements 116-1 through 116-N transmits each of the channel matrices $H_1$ through $H_K$ to MS 130-1 through 130-K, respectively. According to an embodiment, each mobile station includes the plurality number M of the antenna elements configured to receive matrices, data, and/or other transmissions. The antenna elements are denoted as 132-1 through 132-M, 132-1 through 132-M, and continuing to 136-M. Mobile stations 130-1 through 130-K equalize the received signal using a respective receive beamformer, represented as $v_1$ through $v_K$.

As shown in FIG. 1, controller 118 is separate from both the BS 110 and the MSs 130. However, in some embodiments controller 118 may be an integrated component of BS 110. In some embodiments, controller 118 will be integrated with multipliers 112 and adder 114, but separate from the physical transmission apparatus of BS 110, including antennas 116. Other configurations with variations regarding the integration or separation between controller 118 and other components of BS 110 are contemplated within the scope of the present application and will be readily apparent to one of skill in the relevant art.

The various signals for users 1 to K are now generally described in mathematical terms. The transmission will be described as reception by the $k^{th}$ mobile station, which refers to any random MS within the set. A transmitted data symbol $s_k$ bound for the $k^{th}$ MS is modulated with a transmit beamformer $w_k$, which is a N×1 complex vector. On the receiver side, the $k^{th}$ MS performs equalization using the receive beamformer $v_k$, which is a 1×M complex vector. The received signal at the $k^{th}$ MS, denoted by the variable $y_k$, is given by the expression shown below in Equation 1.

$$y_k = v_k H_k w_k s_k + \sum_{i=1, i \neq k}^{K} v_k H_k w_i s_i + z_k, \quad (1)$$

In the above expression, $H_k$ is a channel matrix of M×N complex values. The term $z_k = v_k n_k$ is the equalized noise component. In the following expressions, the instantaneous signal-to-interference-plus noise ratio (SINR) for the $k^{th}$ MS is denoted as "$\gamma_k$" and is represented mathematically as seen in Equation 2 below.

$$\gamma_k = \frac{|v_k H_k w_k|^2}{\|v_k\|^2 \sigma_k^2 + \sum_{i=1, i \neq k}^{K} |v_k H_k w_i|^2}. \quad (2)$$

For the purposes of this application, a Kronecker-structured model for the channel covariances is considered, i.e., $$H_k = R_k^{\frac{1}{2}} \overline{H}_k T_k^{\frac{1}{2}}.$$

In this expression, there is a separation of transmit and receive correlation, denoted by $T_k$ and $R_k$, respectively. As shown above, $T_k$ is a complex N×N matrix, while $R_k$ is a complex M×M matrix. Other relationships that further define Equation 2 include that $\overline{H}_k \sim CN(0,I)$, and $$\overline{v}_k = v_k R_k^{\frac{1}{2}},$$

as well as $$\overline{w}_k = w_k T_k^{\frac{1}{2}}.$$

Assuming that $\overline{H}_k$ can be transformed in its vector form, denoted by, $\overline{h}_k = vec(\overline{H}_k)$, where $\overline{h}_k$ is a complex MN×1 matrix, the composite channel can be expressed in signal and interference parts. These parts take the expressions $H_k \overline{w}_k = (I_M \otimes \overline{w}_k^T) \overline{h}_k$ and $\overline{H}_k \overline{w}_i = (I_M \otimes \overline{w}_i^T) \overline{h}_k$, respectively. Accordingly, $\gamma_k$ can be expressed in canonical quadratic form as shown in Equation 3 below. The desired and co-channel interference terms used as a portion of that expression are Hermitian matrices A and B, which are defined as shown below in Equations 4 and 5.

$$\gamma_k = \frac{\|\overline{h}_k\|_A^2}{\|v_k\|^2 \sigma_k^2 + \|\overline{h}_k\|_B^2}, \quad (3)$$

$$A = (I_M \otimes \overline{w}_k^T)^H \overline{v}_k^H \overline{v}_k (I_M \otimes \overline{w}_k^T), \quad (4)$$

$$B = \sum_{i=1, i \neq k}^{K} (I_M \otimes \overline{w}_i^T)^H \overline{v}_k^H \overline{v}_k (I_M \otimes \overline{w}_i^T). \quad (5)$$

In order to derive the closed form expression of the outage probability of $k^{th}$ MS, i.e., $P_k(w_k, v_k, \gamma) = Pr\{\gamma_k < \}$, Equation 3 can be converted to a cumulative distributive function. Here, since $\gamma$ is a predefined threshold for the SINR at the MSs, the outage probability $P_k(w_k, v_k, \gamma)$ represents a probability that the SINR at the $k^{th}$ MS $\gamma_k$ is less than the predefined threshold $\gamma$ for the SINR, for a given set of the beamformers $w_k$ and $v_k$.

The Kronecker-structured model for the channel covariance disclosed in Weichselberger was considered in the system model described above, which enables the representation of the canonical quadratic form appearing above in Equation 3. This canonical form has a closed form expression obtained using an indefinite quadratic formulation, as given in Hassan I. However, Equation 3 described above has different weight matrices A and B as compared to those explored in Hassan I. Accordingly, the framework of indefinite quadratic forms disclosed in this application results in the closed form expression of the outage probability of the $k^{th}$ MS given by Equation 6 below:

$$P_k(w_k, v_k, \gamma) = 1 - \sum_{t=1}^{T} \frac{\frac{\lambda_t^T}{|\lambda_t|}}{\prod_{i=1, i \neq t}^{T} (\lambda_t - \lambda_i)} e^{-\frac{\|v_k\|^2 \sigma_k^2 \gamma}{\lambda_t}} u\left(\frac{\|v_k\|^2 \sigma_k^2 \gamma}{\lambda_t}\right). \quad (6)$$

In above Equation 6, $\lambda_t$ is the $t^{th}$ eigenvalue of A−γB, and u(·) is the unit step function signifying only positive eigenvalues for the summation variable. Conversely, the product operator in the denominator of Equation 6 accounts for both positive and negative eigenvalues.

For further utilizing this cumulative distributive function, i.e., the closed form expression of the outage probability, the functional goal becomes solving the multi-objective and constrained outage probability minimization problem, which is expressed generally by Equation 7 below.

$$\underset{\{w_k, v_k\}_{k=1}^{K}}{\text{minimize}} \{P_k(\{w_k\}\{v_k\}, \gamma)\}_{k=1}^{K}, \quad (7)$$

$$\text{subject to } \sum_{k=1}^{K} \|\{w\}_k\|_2^2 \leq 1.$$

Here, $\{w_k\}$ and $\{v_k\}$ denote that the transmit beamformer $w_k$ and the receive beamformer $v_k$ are minimization variables. The constraint shown in Equation 7 on the sum of the norms of the transmit beamformer (i.e., the limit that it is less than or equal to 1) normalizes the BS's transmission power.

Several objective functions are defined including the outage probability expressed in Equation 6. Then the minimization problem expressed generally by Equation 7 is formulated as a problem of minimizing an objective function for reducing the outage probability of all users. In order to minimize these objective functions, the direction and the power loading of the beamformers for the statistical CSI case are jointly designed. Generically considered, Equation 7 defines the minimization of the outage probabilities taking into all users account. Thus, the ultimate objective is an appropriate Pareto front. Because the end result has multiple objectives, three methods of reaching the solution are described herein according to embodiments of the present application.

A first approach disclosed in the present application is minimization of a weighted sum of the outage probabilities, i.e., a linear-scalarization. Within this approach, there are at least two embodiments, a Direct Utility Function Minimization (DUFM) technique and a Block-Coordinate Descent Minimization (BCDM) implementation. Even with these two options there are further embodiments, as either of a parallel or a centralized approach under a non-distributed beamforming pretext may be employed. In the parallel technique, the beamforming is achieved locally and independently by all nodes, i.e., by each individual base station and mobile station. In the centralized approach, a centrally located main system controller (such as the one shown in FIG. 1 independent of BS 110) finds transmit and receive beamformers. The main system controller then feeds the optimal beamformers back to the respective nodes.

The linear-scalarization approach provides an opportunity for the appropriate bias for each user in the network. The convergence criteria for these two approaches include total permissible function evaluations, iterations, and the absolute difference between successive iterations. In one embodiment, to achieve joint transmit and receive beamformer design, a weighted sum of the outage probabilities is defined as an objective function.

Figure 2:
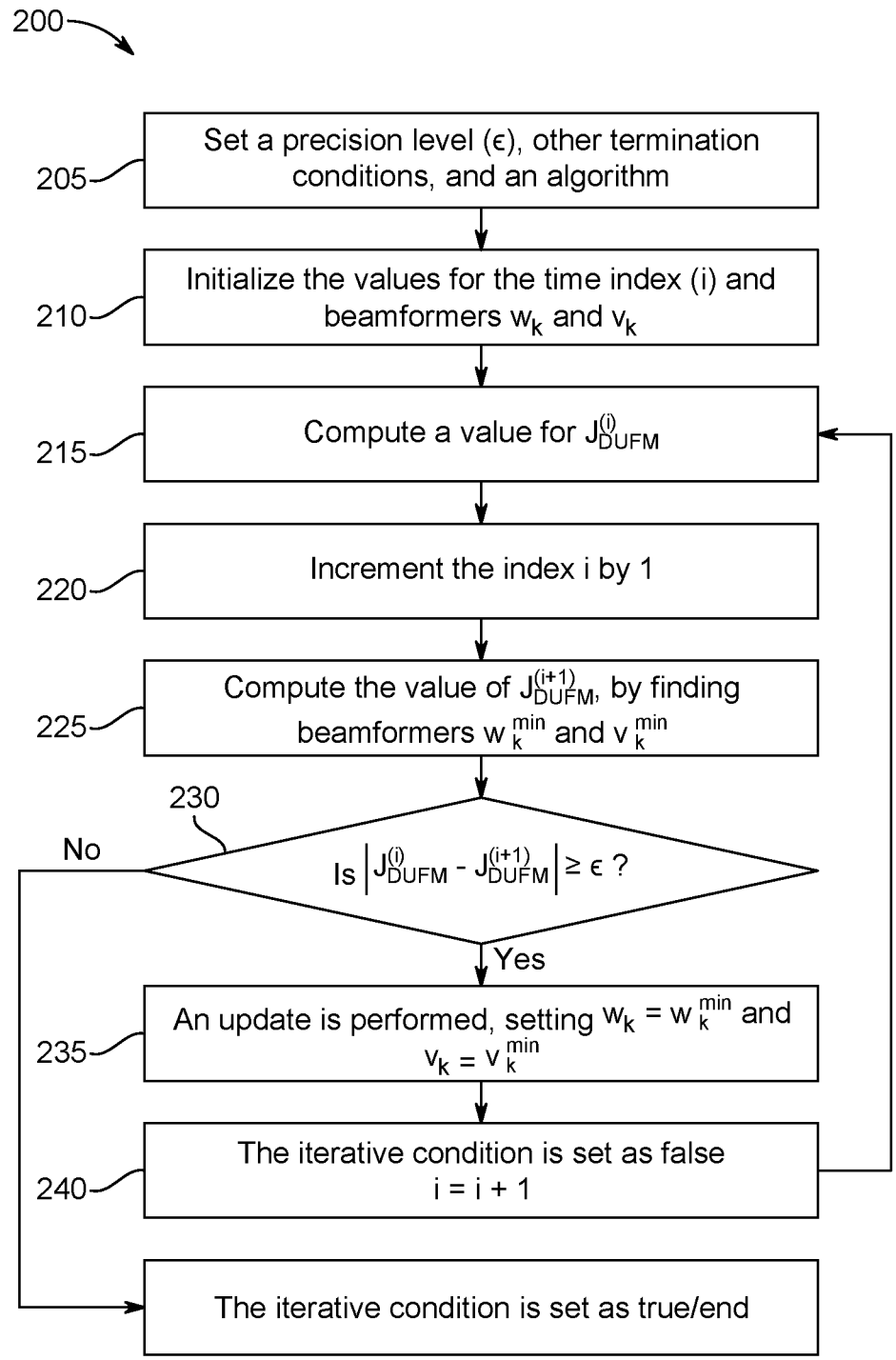
FIG. 2 is an exemplary flowchart of a method of controlling a MU-MIMO wireless network system, according to certain embodiments.

FIG. 2 illustrates an exemplary minimization algorithm and a flow chart for the Direct Utility Function Minimization (DUFM) approach according to certain embodiments. This is a centralized approach, and provides the joint transmit and receive beamformers design for all users. Under this framework, the problem of minimizing the objective function is constructed by defining an objective function with the weighted sum of the outage probabilities of all of the MSs. This results in a Pareto minimized solution $J_{DUFM}$ of the objective function, as expressed below by Equation 8. Here, $\zeta_k$ represents the scalarization parameter, or the weighting factor for the $k^{th}$ MS, with the constraint that $\zeta_k \geq 0$, for all instances of k, while the sum of all $\zeta_k$ is one.

$$J_{DUFM} = \min_{\{W_k\},\{v_k\}} \sum_{k=1}^{K} \zeta_k P_k(\{w_k\}, \{v_k\}, \gamma), \quad (8)$$

$$\text{subject to } \sum_{k=1}^{K} \|\{w\}_k\|_2^2 \leq 1, \sum_k \zeta_k = 1, \zeta_k \geq 0 \text{ for all } k.$$

While the convexity of the objective function is not certain, the function itself is smooth. In turn, the feasible set is convex and has a smooth description. Therefore, several methods for approximation are available that can be initialized from different starting points. The same methods can give local solutions on a Pareto front. A specific solution can be considered and selected from these solutions as described in further detail below with respect to FIG. 6. The methods include active-set, sequential quadratic programming (SQP) based, and sequential interior-point approaches.

As represented by the flowchart in FIG. 2, a method 200 for the DUFM algorithm can be used with opportunities for several alternative implementations. At a step 205, a precision level ($\epsilon$), and other termination conditions are set, along with the selection of an algorithm. One of several algorithms can be selected, e.g., an active-set, sequential quadratic programming (SQP), or interior point algorithm. At a step 210, the values for the time index (i) are initialized, as are the values for the transmit beamformers $w_k$ and the receive beamformers $v_k$.

At a step 215, method 200 includes computing a value for $J_{DUFM}$ at time index i, denoted by $J_{DUFM}^{(i)}$, using Equation 8 as described above. At a step 220, the time index i is then incremented by 1. The value of $J_{DUFM}$ is then computed again at step 225, with time index i+1, denoted by $J_{DUFM}^{(i+1)}$, by finding a solution set to the problem of minimizing the objective function with a transmit beamformers $w_k^{min}$ and a receive beamformers $v_k^{min}$ for k=1 to K, where the solution set is required to bring $J_{DUFM}^{(i+1)}$ not greater than $J_{DUFM}^{(i)}$.

At a step 230, a comparison is made to verify if a difference ($J_{DUFM}^{(i)} - J_{DUFM}^{(i+1)}$ is greater than or equal to the set precision level ($\epsilon$). If the difference is greater than or equal to the set precision level, an update is performed at a step 235 on $w_k$ and $v_k$, and $J_{DUFM}^{(i)}$, setting $w_k = w_k^{min}$, $v_k = v_k^{min}$. The iterative condition is set as false at a step 240 and the method 200 returns to step 215. Steps 215-240 are iterated until the difference turns out to be smaller than the set precision level, in which event the iterative condition is set as true and the method ends.

In some embodiments, method 200 can be performed by the controller 118 as shown above in FIG. 1, whether the controller 118 is integral to or merely in communication with BS 110. The calculated matrices and symbols can be used by the BS 110 and the MSs 130-1 through 130-N. In other embodiments, the method 200 can be performed by other resources of the system 100 and merely implemented by the BS 110 or the controller 118. One of skill in the relevant art will understand other embodiments are possible using alternative components to perform various portions of the above method without departing from the scope of the present disclosure.

Figure 3:
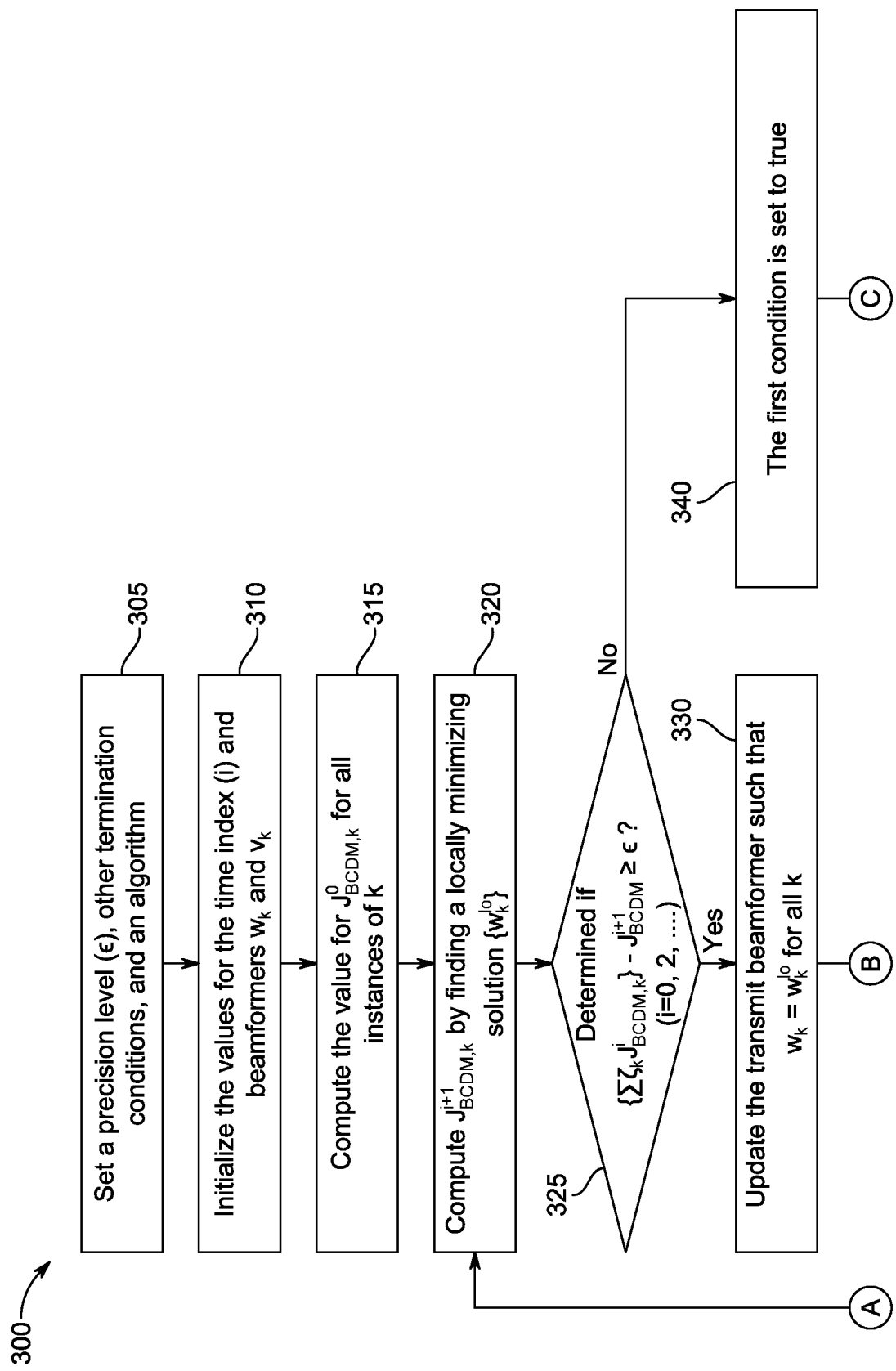
FIG. 3 is an exemplary flowchart of another method of controlling a MU-MIMO wireless network system, according to certain embodiments.
Figure 3:
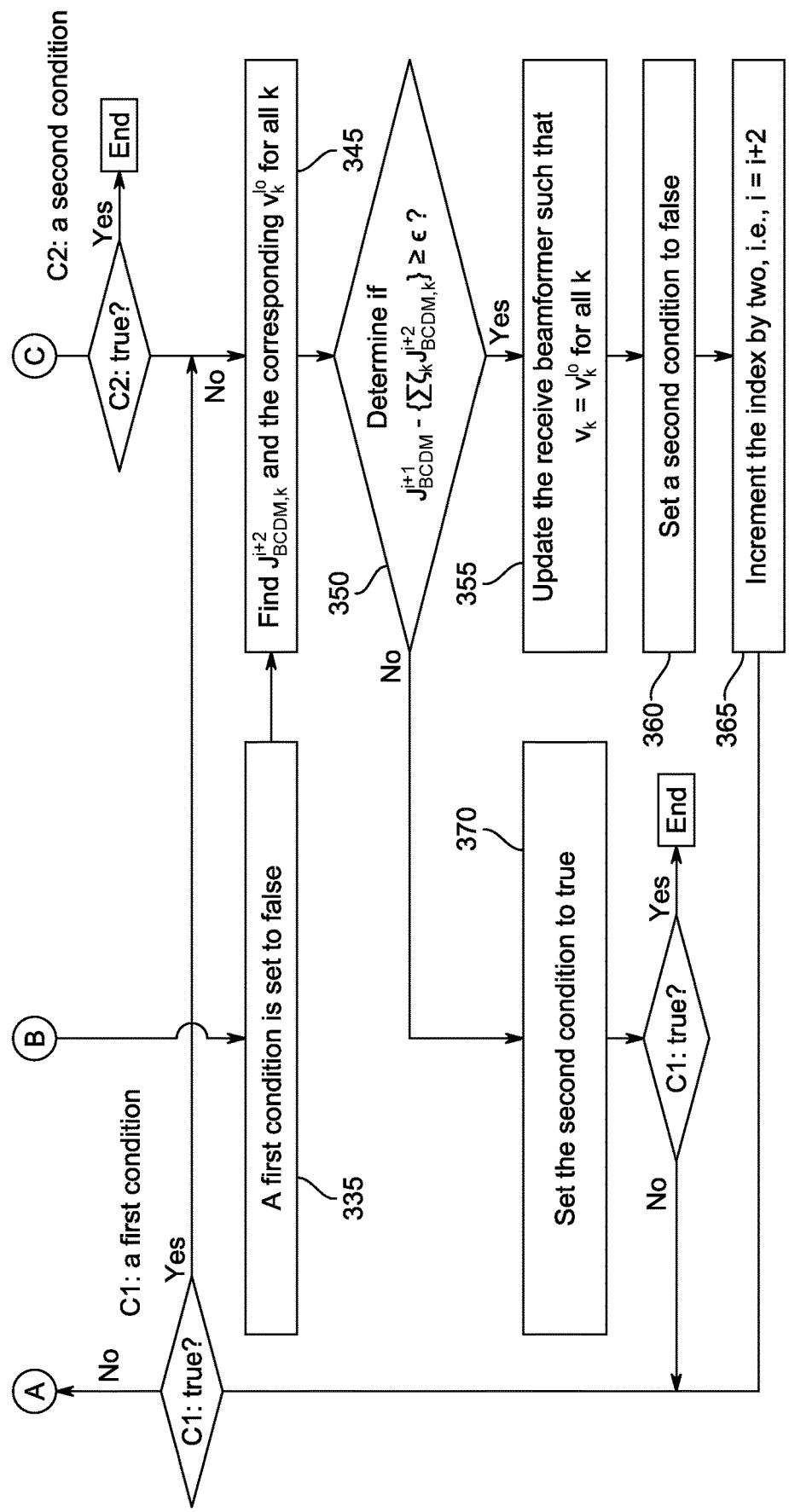

FIG. 3 illustrates an exemplary minimization algorithm and a flow chart for the Block-Coordinate Descent Minimization (BCDM) approach, according to certain embodiments. In the BCDM approach, an alternating minimization approach is implemented, where the transmit beamformers and the receive beamformers are updated during alternate recursions. This approach, closely related to the DUFM approach, reduces complexity of solving the joint minimization problem in a centralized manner.

The transmit beamformer (i.e., $w_k$) may be computed initially, which may then be relayed to the receiver side so that the receive beamformer (i.e., $v_k$) can be computed. Once initialized, iterations of the algorithm are performed until convergence is achieved. This results in obtaining a Pareto minimized point for the original multi-objective problem.

The alternating algorithm developed as a part of this BCDM approach is outlined below. At the odd iteration (i.e., 2i+1, with the time index i=0, 1, . . . ), a minimization problem is constructed by defining an objective function with the weighted sum of the outage probabilities of all of the MSs. Further, the transmit beamformers $\{w_k\}$ are chosen as a minimizing variable to be updated, while maintaining the current receive beamformers $v_k$. This results in a locally minimized solution $J_{BCDM}^{(2i+1)}$ of the objective function at the odd iteration (2i+1), as expressed by Equation 9 below.

$$J_{BCDM}^{(2i+1)} = \min_{\{w_k\}} \sum_{k=1}^{K} \zeta_k P_k(\{w_k\}, v_k, \gamma), \quad (9)$$

$$\text{subject to } \sum_{k=1}^{K} \|w_k\|_2^2 \leq 1, \sum_k \zeta_k = 1, \zeta_k \geq 0 \text{ for all } k.$$

$$P_k(\{w_k\}, v_k, \gamma) \leq P_k(\{w_k^{(2i-1)}\}, v_k, \gamma)$$

The locally minimized solution $J_{BCDM}^{(2i+1)}$ for Equation 9 relies on the current receive beamformers $v_k$ and the transmit beamformers $\{w_k^{(2i-1)}\}$ for the previous odd iteration (2i−1). The second constraint ensures that there is no increase in the outage probability, for any user, at the iteration in question.

While the above applies to odd iterations, K independent problems to be minimized are formulated at the even iterations (i.e., 2i). The $k^{th}$ of those problems is expressed by Equation 10 with a locally minimized solution $J_{BCDM,k}^{(2i)}$ as below. Here, the receive beamformers $\{v_k\}$ are chosen as a minimizing variable to be updated, while maintaining the current transmit beamformers $w_k$. The locally minimized solution $J_{BCDM,k}^{(2i)}$ is solved relying on the current transmit beamformer $w_k$ and the receive beamformer updated at the previous odd iteration $\{v_k\}^{2i-1}$, as observed in the second constraint ensuring that there is no increase in the outage probability, for any user, at the iteration in question.

$$J_{BCDM,k}^{(2i)} = \min_{v_k} P_k(w_k, \{v_k\}, \gamma), \quad (10)$$

$$\text{subject to } P_k(w_k, \{v_k\}, \gamma) \leq P_k(w_k, \{v_k^{2(i-1)}\}, \gamma)$$

Although this technique simplifies the equations to be solved at each iteration, those sub-problems are not known to be convex. As a result, smooth approximation techniques are used both for Equations 9 and 10.

As represented by the flowchart in FIG. 3, a method 300 for the BCDM algorithm can be used with opportunities for several alternative implementations. At a step 305, the precision level ($\epsilon$), and other termination conditions are set, along with the selection of an algorithm. One of several algorithms can be selected, e.g., an active-set, sequential quadratic programming (SQP), or interior point algorithm. At a step 310, the value for the time index (i) is initialized (i=0), as are the values for beamformers $w_k$ and $v_k$. Both the first and the second conditions are set as false.

At step 315, the value for $J_{BCDM,k}^{0}$ is computed for all instances of k using Equation 10 as outlined above. At a step 320 an iterative loop is started, where $J_{BCDM,k}^{i+1}$ (i+1=1, 3, . . . ) is computed by finding a locally minimizing solution for equation 9 and a corresponding transmit beamformer $\{w_k^{lo}\}$ as a minimizing variable. At a step 325, it is determined whether the sum of the product of the weighting factor $\zeta_k$ and $J_{BCDM,k}^{i}$ (i=0, 2, . . . ) for all instances of k, minus $J_{BCDM}^{i+1}$ (i.e., $\{\Sigma \zeta_k J_{BCDM,k}^{i}\} - J_{BCDM}^{i+1}$ is greater than or equal to the precision level.

If the determination at step 325 is yes (i.e., if the difference is greater than or equal to the specified precision level), then the transmit beamformer is updated at a step 330 such that $w_k = w_k^{lo}$. A first condition is also set to false at step 335 to continue the iterative process for the transmit beamformer. If the determination at step 325 is no (i.e., if the difference is less than the precision level), then the first condition is set to true at a step 340 to end the iterative process for transmit beamformer, where if the second condition was also true, the process 300 ends. So far as the second condition was false, the process 300 continues to the step 345 for the iterative process for the receive beamformer.

At a step 345, $J_{BCDM,k}^{i+2}$ (i+2=2, 4, . . . ) and the corresponding receive beamformer $\{v_k^{lo}\}$ are found for all k by finding a locally minimizing solution of Equation 10 with the receive beamformer $\{v_k\}$ as minimizing variable. At a step 350, a check is performed to determine if whether $J_{BCDM}^{i+1}$ minus the sum of the $\zeta_k J_{BCDM,k}^{i+2}$ (i.e., $J_{BCDM}^{i+1} - \{\Sigma \zeta_k J_{BCDM,k}^{i+2}\}$) is greater than the precision level. If the determination at step 350 is yes, i.e., the difference is greater than the precision level, then the receive beamformer is updated at a step 355 such that $\{v_k\} = \{v_k^{lo}\}$ for all k. A second condition is also set to false at step 360 to continue the iterative process for the receive beamformer. At a step 365, the index is incremented by two, i.e., i=i+2 at a step 365, and then, the process 300 returns to the step 320, if the first condition was true, otherwise, the process 300 returns to the step 345.

If the determination at step 350 is no (i.e., the difference is less than the selected precision level), then the second condition is set to true at a step 370. Here the process also returns to the step 320, if the first condition was false, otherwise the process 300 ends.

This entire process (i.e, steps 320-370) continues until the differences are both within the precision levels, that is to say, both the first condition and the second condition are true at steps 340 and 370.

In another embodiment, called Direct Multi-Objective Simultaneous Minimization (DMSM), a hybrid evolutionary algorithm enables searching directly for points on the Pareto front of the multi-objective problem (i.e., the outage probability of each user). Final selection is made based on an Euclidean distance criterion once the Pareto front is established. According to some embodiments, multi-objective genetic and goal attainment algorithms may be used to reduce the complexity of this technique.

The DMSM technique can also be used to solve the multi-objective problem of Equation 7 shown above. In DMSM, a fusion of bio-inspired multi-objective genetic algorithms and a multi-objective goal-attainment algorithm is used. For purposes of this disclosure, the mixture of techniques is referred to as the 'Evolution-Hybrid' algorithm. In an embodiment, the multi-objective genetic algorithm initially leads to a Pareto front with sub-minimized solutions. These values are used as initial points for the multi-objective goal attainment algorithm to exploit the multi-objective goal attainment algorithm's convergence speed and higher efficiency in local search tasks.

The DMSM approach can be outlined with two blocks. In the first block, the initial DMSM problem is formulated with K objective functions as expressed in Equation 11 below with an iteration index (i).

$$J_{DMSM,k}^{i+1} = \min_{\{w_k\},\{v_k\}}, P_k(\{w_k\},\{v_k\},\gamma), \quad (k = 1 \text{ to } K) \quad (11)$$

$$\text{subject to } \sum_{k=1}^{K} \|w_k\|_2^2 \leq 1,$$

$$P_k(\{w_k\},\{v_k\},\gamma) \leq P_k(\{w_k^i\},\{v_k^i\},\gamma)$$

Here, there are K objective functions corresponding to the $k^{th}$-MS (k=1 to K), each with N elements for $w_k$, and M elements for $v_k$, thus, there are K(N+M) decision variables as a total. Next, the object function is reconfigured as an L×K matrix comprising L-Pareto sub-minimized solutions and K objectives as expressed in Equation (12). Here same constraints as in Equation (11) applies.

$$J_{DMSM} = \{\{P_k(\{w_{l,k}\},\{v_{l,k}\},\gamma,l)\}_{k=1}^{K}\}_{l=1}^{L}, \quad (12)$$

In the second block, solutions for the beamformers $\{w_k\}$ and $\{v_k\}$ which violate the second constraint of Equation (11) are discarded. Thus, the total solutions are reduced from L to $\tilde{L}$. Further, a $l^{th}$ row Pareto front (where l is an element of the set $\{1, 2, \ldots, L\}$) is chosen in each iteration. This selection is made based on the sum of $L^2$-norm between the an original Pareto front $\{P_k(\{w_{l,k}\},\{v_{l,k}\},\gamma,l)\}_{k=1}^{K}$ and a minimized Pareto front $\{P_k(\{w_{l,k}^{lo}\},\{v_{l,k}^{lo}\},\gamma,l)\}_{k=1}^{K}$ at the iteration. The $l^{th}$ Pareto front with the maximum Euclidean distance at the iteration is selected and the beamformers are updated as $w_k = w_{l,k}^{lo}$, $v_k = v_{l,k}^{lo}$ for all k, and for all of the Pareto fronts.

Some components of the DMSM problem according to embodiments are enumerated below with respect to Equations 13-16. An elitist multi-objective genetic algorithm is initialized using an initial population and L solutions are furnished on the Pareto front. For each MS at the solutions on the Pareto front given above, extrema of outage probabilities are computed (i.e., for the $k^{th}$ MS and the $l^{th}$ solution, where l is an element of the set $\{1, 2, \ldots, L\}$) using Equations 13 and 14.

$$J_{max} = \{_l^{max} \, P_k(\{w_k\}, v_k, \gamma, l)\}_{k=1}^{K} \quad (13)$$

$$J_{min} = \{_l^{min} \, P_k(\{w_k\}, v_k, \gamma, l)\}_{k=1}^{K} \quad (14)$$

At each solution, a weight g(k, l) is computed for the $k^{th}$ objective. Within this context, (1) as shown in Equations 15 and 16 below is the total weight computed at each solution.

$$g(k, l) = f(l) \frac{J_{max}(k) - P_k(\{w_k\}, v_k, \gamma, l)}{1 + J_{max}(k) - J_{min}(k)} \quad (15)$$

$$f(l) = \sum_{k=1}^{K} \frac{J_{max}(k) - P_k(\{w_k\}, v_k, \gamma, l)}{1 + J_{max}(k) - J_{min}(k)} \quad (16)$$

A goal vector $\{P_k(\{w_k\}, v_k, \gamma, l)\}_{k=1}^{K}$ and a weight vector $\{g(k, l)\}_{k=1}^{K}$ are used to initialize the goal attainment routine for each solution l. This results in a local Pareto front with L Pareto sub-solutions for K objectives and, as described above, warrants further processing.

Figure 4:
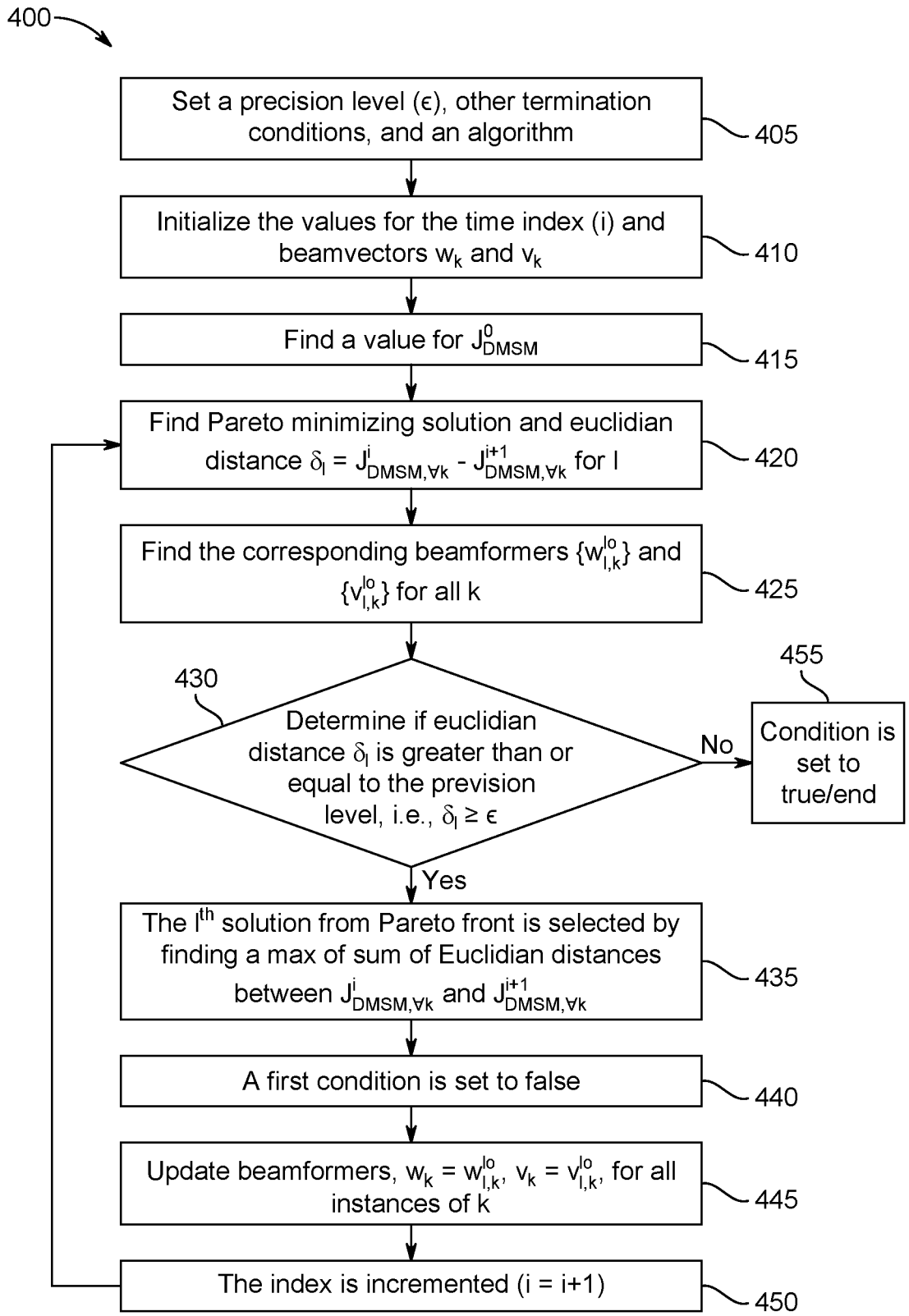
FIG. 4 is an exemplary flowchart of another method of controlling a MU-MIMO wireless network system, according to certain embodiments.

FIG. 4 illustrates an exemplary flowchart of the DMSM approach with pareto front. A method 400 for the DMSM algorithm can be used with opportunities for several alternative implementations. At a step 405, the precision level (E), and other termination conditions are set, along with the selection of an algorithm. One of several algorithms can be selected, e.g., an evolution-hybrid algorithm. At a step 410, the value for the time index (i) are initialized, as are the values for beamformers $w_k$ and $v_k$.

At a step 415, a value is found for $J_{DMSM}^0$ of each of the Pareto fronts using Equation 12 as given above. At step 420 a potentially iterative cycle is started, where a Pareto minimizing solution and a Euclidean distance $\delta_l$ is found for l which is an element of the set $\{1, 2, \ldots, L\}$, i.e., $\delta_l = J_{DMSM,\forall k}^i - J_{DMSM,\forall k}^{i+1}$ for all instances of k. At a step 425, corresponding beamformers $\{w_{l,k}^{lo}\}$ and $\{v_{l,k}^{lo}\}$ for all k are found using Equation 12.

At step 430, the controller determines if the Euclidean distance is greater than or equal to the prevision level, i.e., whether or not $\delta_l \geq \epsilon$. If the Euclidean distance is greater than the precision level, at step 435 the $l^{th}$ solution from Pareto front is selected by finding a maximum of the Euclidian distances for the L Pareto front. At a step 440, a condition is set to false, i.e., the iterations continue. At step 445, both beamformers are updated ($w_k = w_{l,k}^{lo}$, $v_k = v_{l,k}^{lo}$, for all instances of k). The index is incremented at step 450, such that i=i+1. Method 400 continues to iterate the above steps and increment the index until the condition is true to end iteration, i.e., until the Euclidean distance $\delta_l$ falls within the specified precision level.

At a step 455, if the Euclidean distance $\delta_l$ for the Pareto front is less than the selected precision level value, a first condition is set to true, i.e., the iterations come to an end. In this situation, there is no resetting of beamforming matrices and no incrementing of the index value. The method is simply brought to a conclusion.

In each of the aforementioned embodiments, minimization is performed for a target SINR value $\gamma$. The solution obtained at each iteration ensures that the performance of one set of users improved, while the performance of the remaining users is not degraded. The ultimate solution is based on the nesting of functions. In addition, both real and complex parts of beamformers are independently and simultaneously adjusted.

Figure 5:
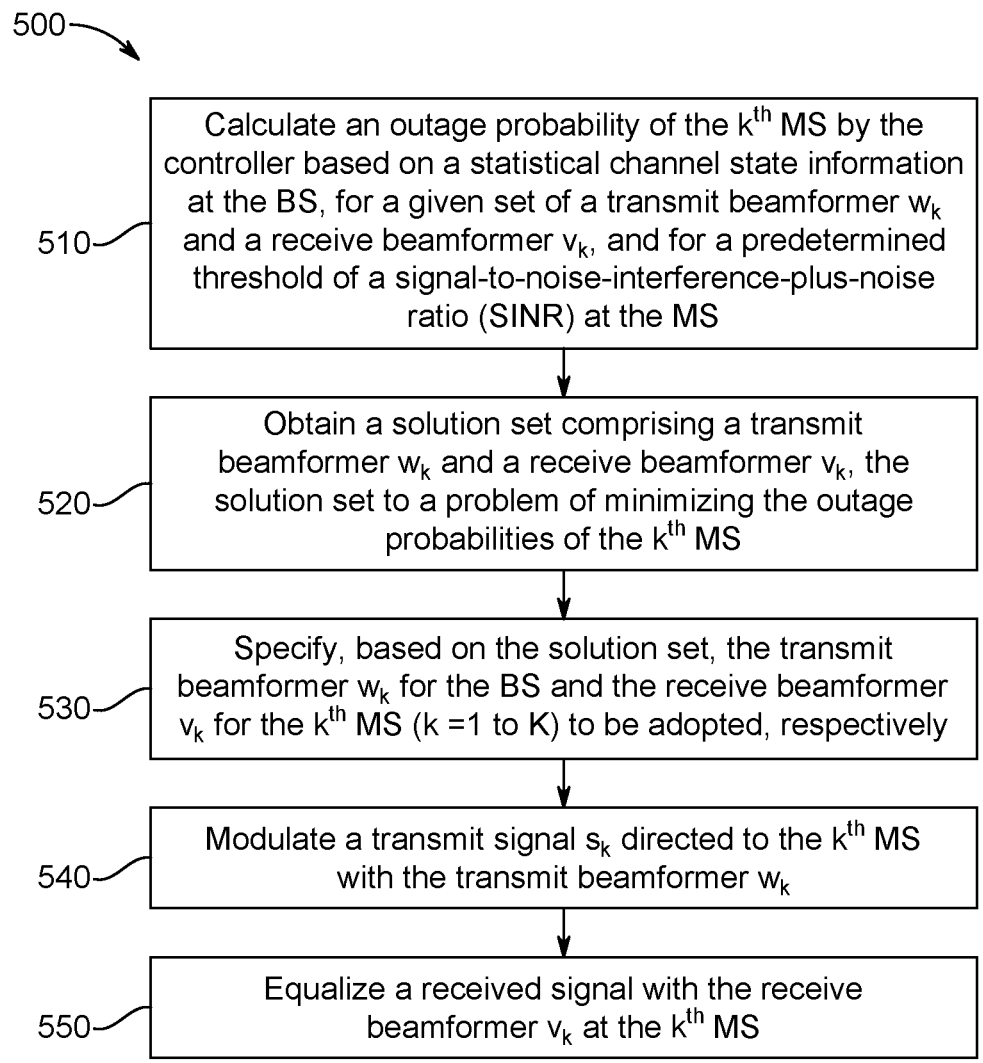
FIG. 5 is an exemplary flowchart of a generalized method of controlling a MU-MIMO wireless network system, according to certain embodiments.

In an embodiment shown in FIG. 5, a generalized method 500 of controlling a multiple-input and multiple-output (MIMO) wireless network system, such as system 100 above, is represented by a flowchart. Method 500 is performed by a base station (e.g., BS 110 shown and described above), a controller (for instance controller 118), and a plurality number K of mobile stations, such as MS 130-1 through 130-K. The BS has an array antenna including a plurality number N of antenna elements. Each of the MSs has an array antenna including a plurality number M of antenna elements. The system's controller includes a processor and a memory with a preinstalled program. The controller is configured to control an operation of the MIMO wireless network system. The BS is configured to modulate a transmit signal $s_k$ directed to a $k^{th}$ MS with a transmit beamformer $w_k$ specified by the controller. The $k^{th}$ MS is configured to equalize a received signal with a receive beamformer $v_k$ specified by the controller.

Method 500 begins at a step 510 by calculating an outage probability $P_k(\{w_k\}, \{v_k\}, \gamma)$ of the $k^{th}$ MS by the controller based on a statistical channel state information at the BS, for a given set of a transmit beamformer $w_k$ and a receive beamformer $v_k$, and for a predetermined threshold $\gamma$ of a signal-to-interference-plus-noise ratio (SINR) at the MS.

At a step 520, a solution set is obtained comprising a transmit beamformer $w_k$ and a receive beamformer $v_k$ by the controller, the solution set to a problem of minimizing the outage probabilities $P_k(\{w_k\}, \{v_k\}, \gamma)$ of the $k^{th}$ MS (k=1 to K), with $\{w_k\}$, $\{v_k\}$ as minimizing variables and under constraints on a sum of the norms of the transit beamformer being not greater than 1, i.e., $$\sum_{k=1}^{K} \|w_k\|_2^2 \leq 1.$$

At a step 530, the controller specifies, based on the solution set, the transmit beamformer $w_k$ for the BS and the receive beamformer $v_k$ for the $k^{th}$ MS (k=1 to K) to be adopted, respectively.

At a step 540, the BS modulates a transmit signal $s_k$ directed to the $k^{th}$ MS with the transmit beamformer $w_k$ specified by the controller. At a step 550, a received signal is equalized, with the receive beamformer $v_k$ specified by the controller, at the $k^{th}$ MS. As described above, the controller can be an integrated part of the base station, a mere component, or separate from the base station altogether.

Figure 6:
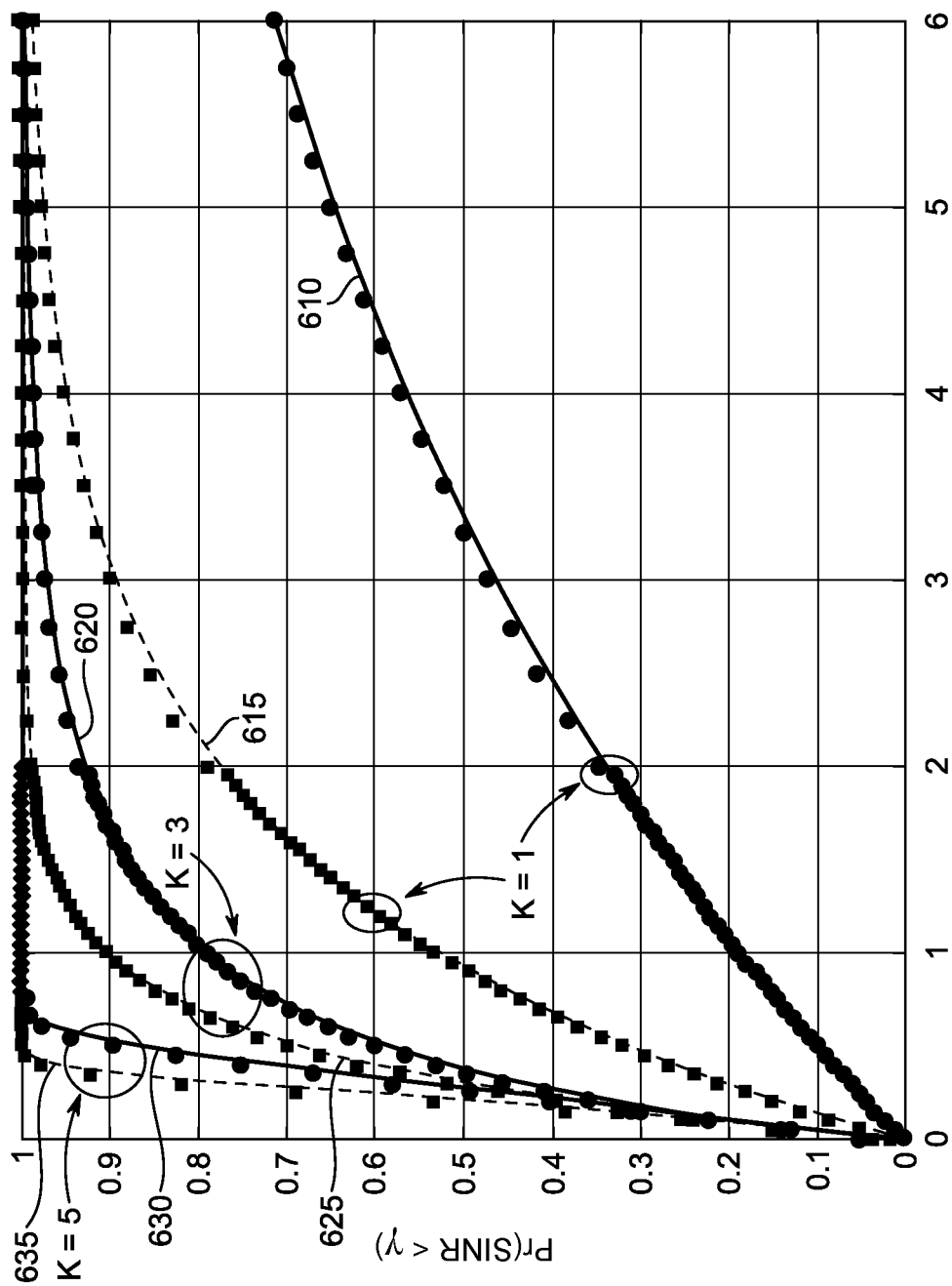
FIG. 6 is an exemplary graph depicting analytical versus simulated outage probabilities, according to certain embodiments.
Figure 7:
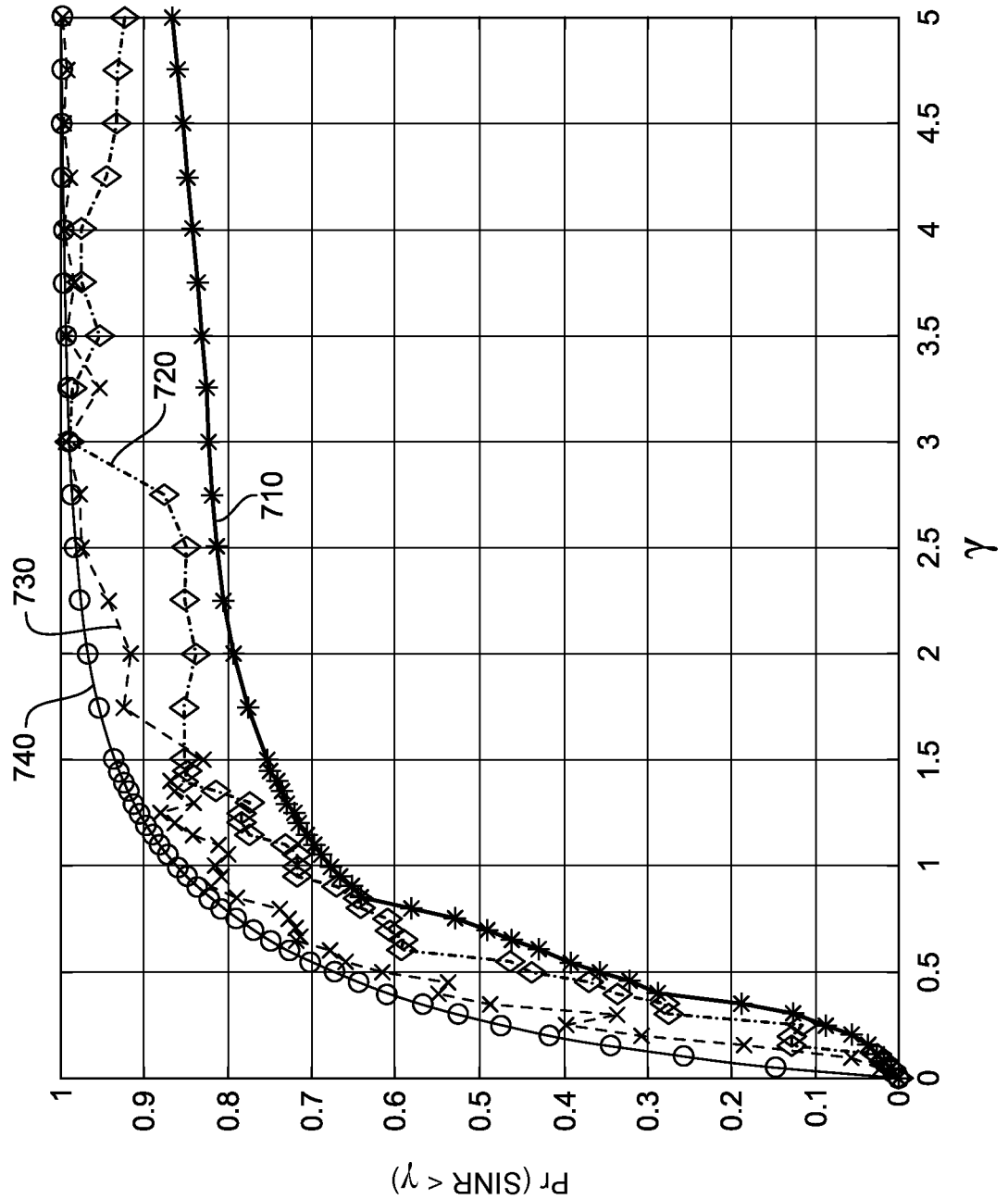
FIG. 7 is an exemplary graph showing a comparison of various beamforming algorithms, according to certain embodiments.

The performance is described below with respect to simulated results of several specific implementations (as shown and described in FIGS. 6-9(c)). As seen in simulated results, system performance with respect to various parameters, such as the outage probability, can be significantly enhanced with the disclosed blind beamforming techniques. Turning to FIGS. 6 and 7, graphs depicting analytical versus simulated outage probabilities of various combinations of algorithms and techniques are described. When designing simulations, the additive noise variance ($\sigma_2^k$) was set as −20 dBm for all instances of k, while total channel simulation realizations were set to 10,000. The simulations described below considered both distinct and exponential transmit and receive correlation matrices.

A first objective of simulation was confirming the closed form result. As shown in FIG. 6, the outage probability of the $k^{th}$ MS in the plurality number K of MS scenario was analyzed. The parameter K was varied, using the value 1, 3, and 5, for curves 610/615, 620/625, and 630/635, respectively. Based on investigations by Hassan et al. (Hassan II), the principal eigenvector (PEV) of the correlation matrices served as the basis for the considered beam vectors. The behavior of the outage probability was observed for both weighting scenarios regarding BS transmit antennas and MS antennas, i.e., N>M and M>N. In each pair of curves, N and M were set to 8 and 4, respectively, in one instance, while inverted to 4 and 8 in the alternate simulation. For example, curve 610 was generated using values of N=8 and M=4, while curve 615 was generated for N=4 and M=8.

As seen in FIG. 6, the outage probability increases with an increase in co-channel interference. For all considered cases, the Monte Carlo simulation results, denoted in point-plot form, match closely the curves. Thus, by extension, simulation results closely match the expression given in Equation 6 above (i.e., the derived closed-form expression).

In subsequent simulations, values for the parameters N, M, and K were set to 6, 4, and 3, respectively. Beamformers used one of the DUFM, BCDM, or DMSM algorithms. Randomly generated transmit beamformers were used to initialize all of the algorithms. To satisfy the total power constraint (i.e., $\Sigma\|w_k\|_2^2 \leq 1$), the algorithms were normalized. The scalarization parameters $\zeta_k$, for all instances of k, were set to 1/K. While the values were maintained during all simulations (i.e., as the inverse of K), one of skill in the relevant arts will understand that the selected weights can be altered. As an example, the parameter can be optimized to compensate for bias involving an individual or a set of users.

Turning to FIG. 7, the BCDM technique was employed to test various non-linear minimization algorithms. For the depicted simulations, the active-set, SQP, and interior-point algorithms were tested within the constrained minimization objectives defined by Equations 9-10. As shown in FIG. 7 by curve 710, the BCDM technique using the active-set algorithm outperformed other alternatives (seen in curves 720, 730, and 740) across a range of γ values. Despite trailing the active-set results of curve 710, the results for an SQP algorithm shown in curve 720 and an interior-point algorithm represented by curve 730 did outperform a random beamforming function as shown in curve 740. Moreover, the monotonicity of curve 710 indicates consistency in locating local minima. As a result, subsequent simulations selected the active-set algorithm to test both the BCDM and DUFM techniques.

Figure 8:
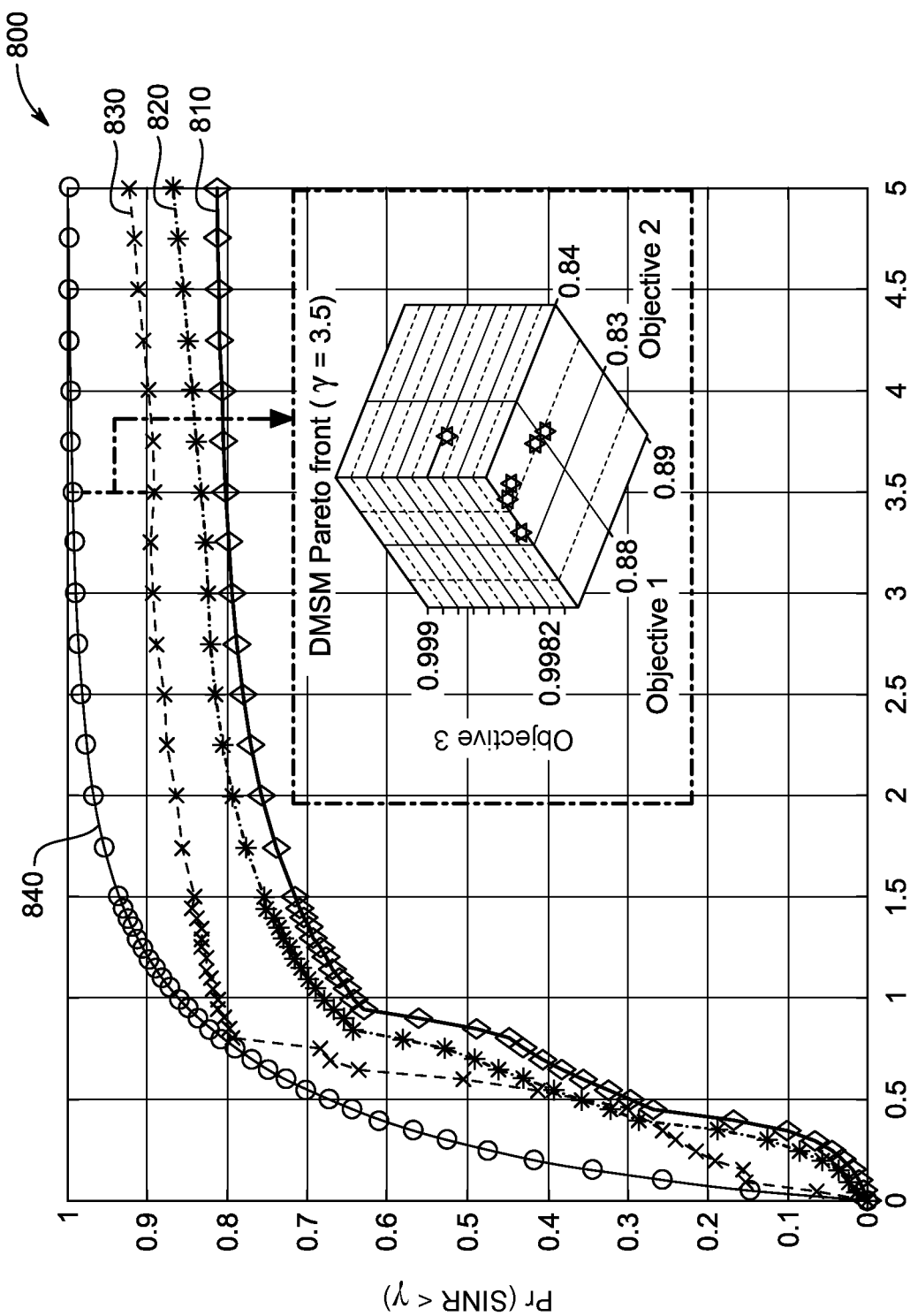
FIG. 8 is an exemplary graph showing a comparison of various beamforming techniques, according to certain embodiments.

FIGS. 8 and 9(a)-9(c) are graphs showing comparisons of various beamforming techniques, according to certain embodiments. In FIG. 8, the effectiveness of a selected algorithm is depicted graphically. The DMSM algorithm with $\tilde{L}=6$ is shown as curve 830 with an inserted figure for a Pareto front obtained using the Evolution-Hybrid algorithm at γ=3.5. Linear-scalarization was not performed in the depicted minimization routine (the scalarized representation of results for the DMSM algorithm in this figure is for comparison purpose only). Each algorithm displayed monotonic behavior as the value of γ increased. However, the DUFM technique coupled with an active-set algorithm resulted in the best simulated performance, shown as curve 810, also without violating predefined constraints. Given the relationship between the DUFM and BCDM algorithms, some degradation in the BCDM technique was expected, which is shown by a slightly higher outage probability of the BCDM, curve 820. However, the simulated degradation between curves 810 and 820 was small, while the computational advantages for the BCDM, curve 820 were significant. Each of curves 810, 820 and 830 outperformed the simulated results with random beamvectors, curve 840.

Figure 9A:
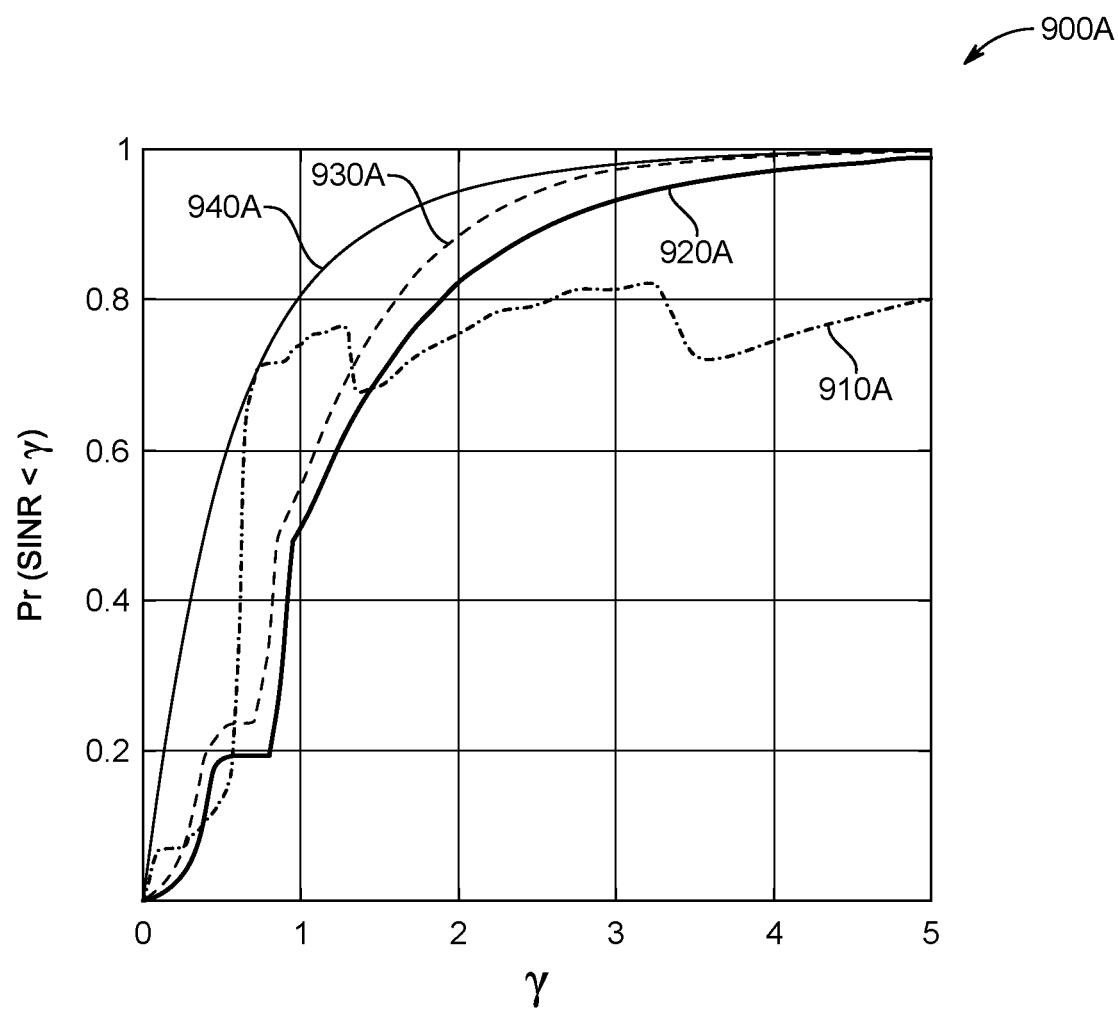
FIG. 9(a)-9(c) are exemplary graphs showing comparisons of various beamforming techniques, according to certain embodiments.
Figure 9B:
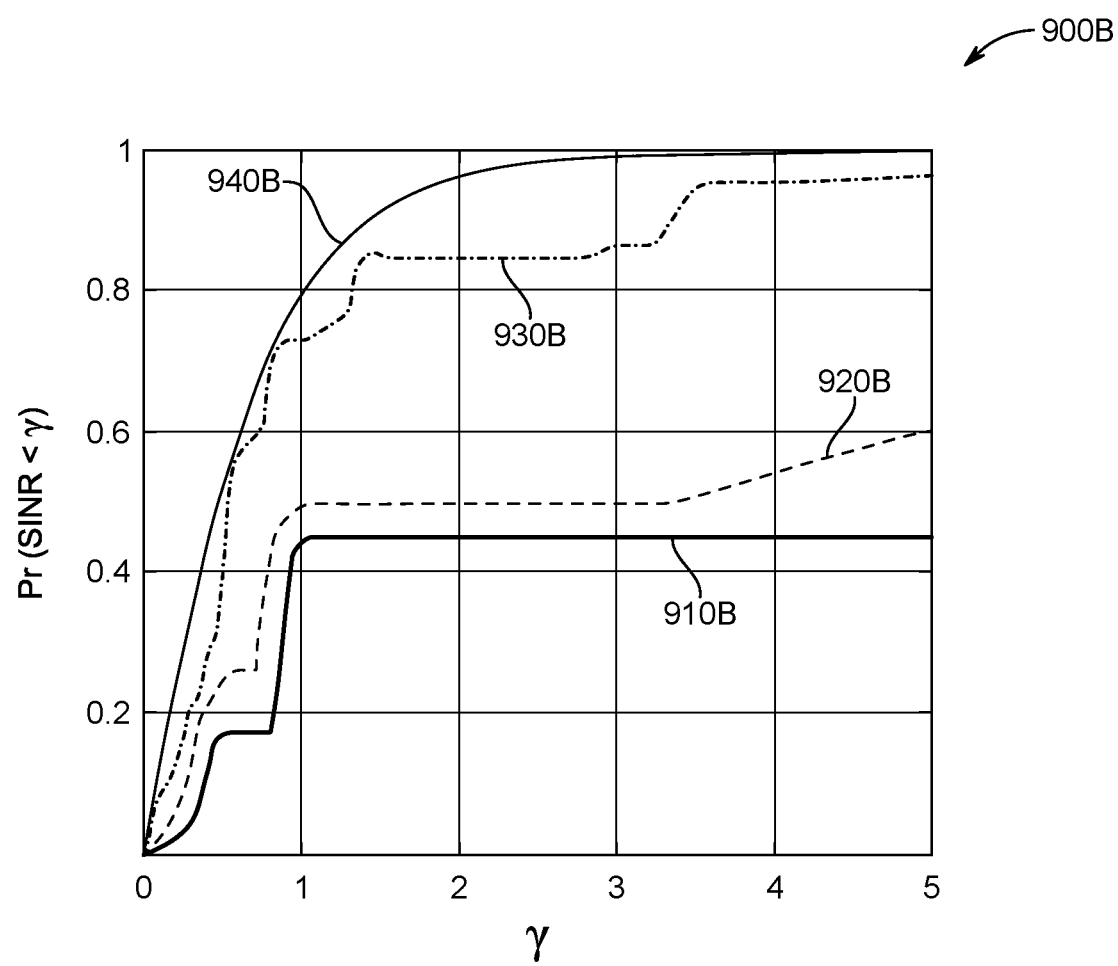
Figure 9C:
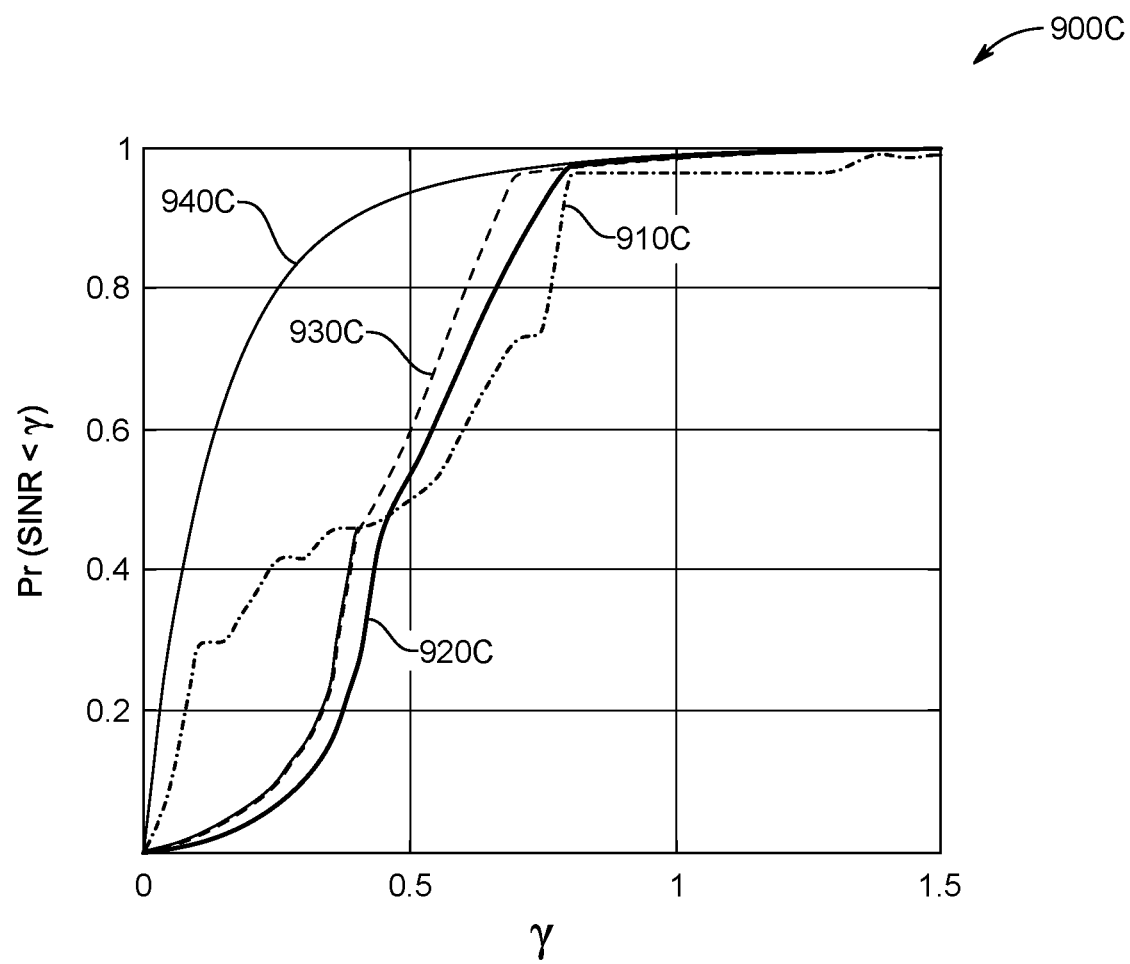

As shown in FIGS. 9(a) through 9(c), the performance of the DUFM technique using the active-set algorithm (represented by curves 920A, 910B and 920C) performs best from the individual user perspective across the range of SINR values. The BCDM/active-set algorithm performed nearly as well as shown in FIGS. 9(a) and 9(c) as shown by curves 930A and 930C, respectively. In the depicted simulations of FIGS. 9(a)-9(c), the DMSM algorithm resulted in a set of beamformers producing different trade-offs between the outage probabilities of each user, particularly with respect to varying γ values. As an example, curve 920A shows better properties for higher values of γ, although the DMSM algorithm did not perform as well with low-γ values. Likewise, curve 910C showed modest improvements with this technique for higher values of γ. All simulations employing a minimizing algorithm showed better outcomes when compared to the random beamforming simulations represented by curves 940A, 940B and 940C.

As shown above, the disclosed solutions reduce the outage probabilities of users within the MU-MIMO system without adversely affecting other users. In doing so, the described algorithms use statistical measures of channel state information, rather than those that consume additional bandwidth. As a result, the above-described solutions are more spectrally efficient in delivery of improved connections. While some solutions provide greater improvements based on selection of specific parameters or values of parameters, each are an improvement over random beam-forming functions.

Figure 10:
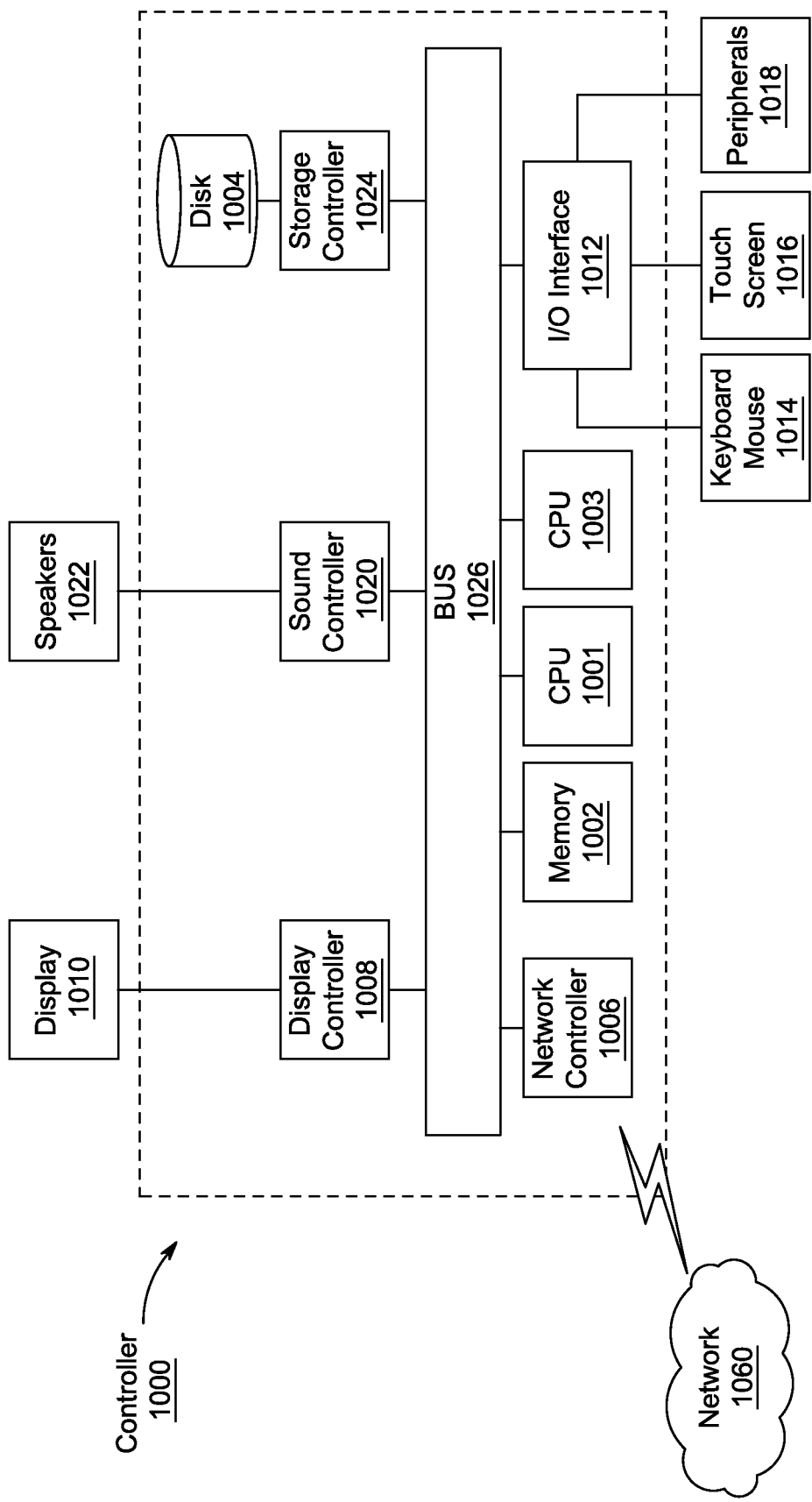
FIG. 10 is an exemplary illustration of a non-limiting example of details of computing hardware used in the computing system, according to certain embodiments.

Next, further details of the hardware description of the computing environment of the MU-MIMO network according to exemplary embodiments is described with reference to FIG. 10. In FIG. 10, a controller 1000 is described and is representative of a computing device as described above with respect to the base station. Controller 1000 is a computing device which includes a CPU 1001 that performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the relevant art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
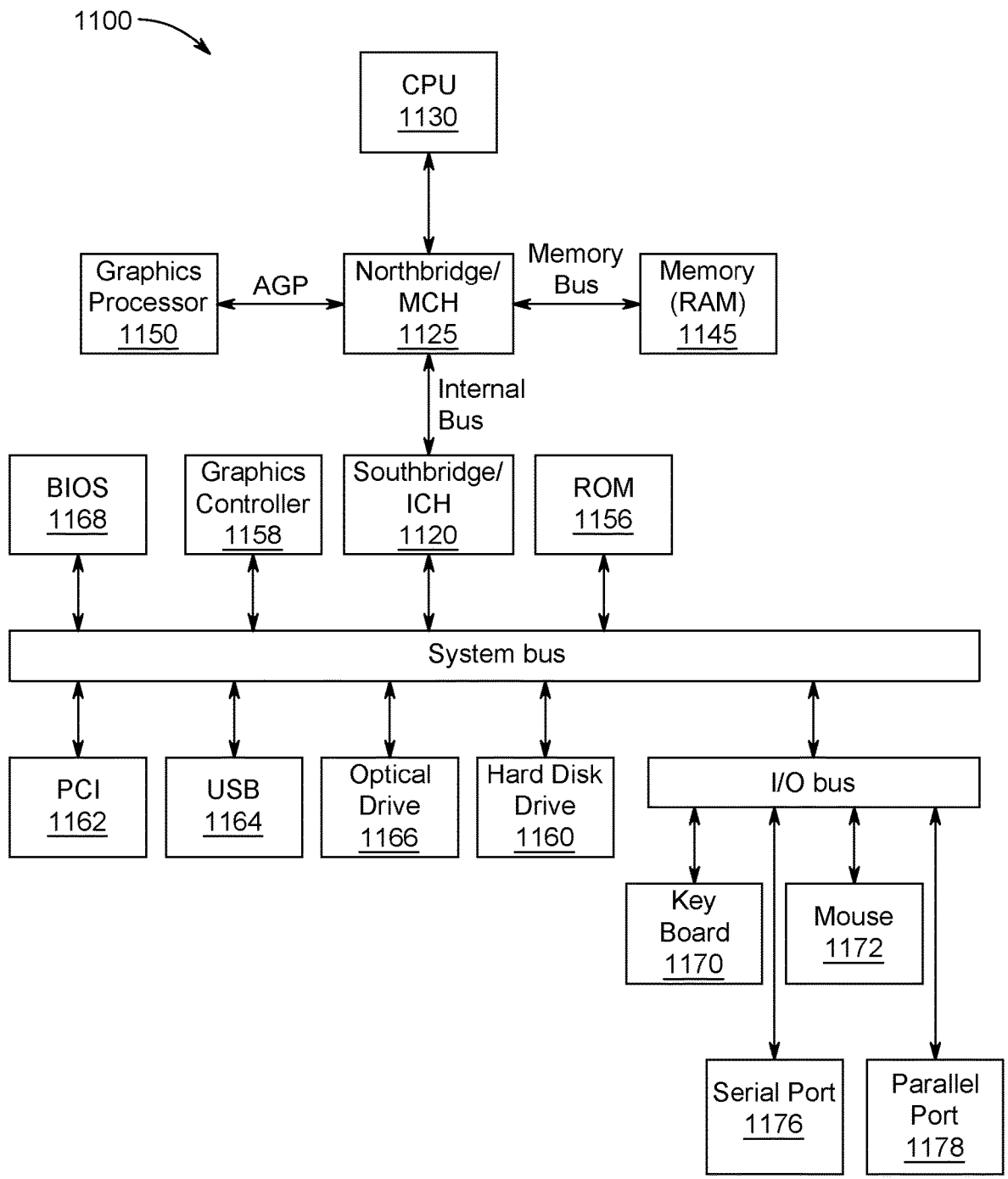
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
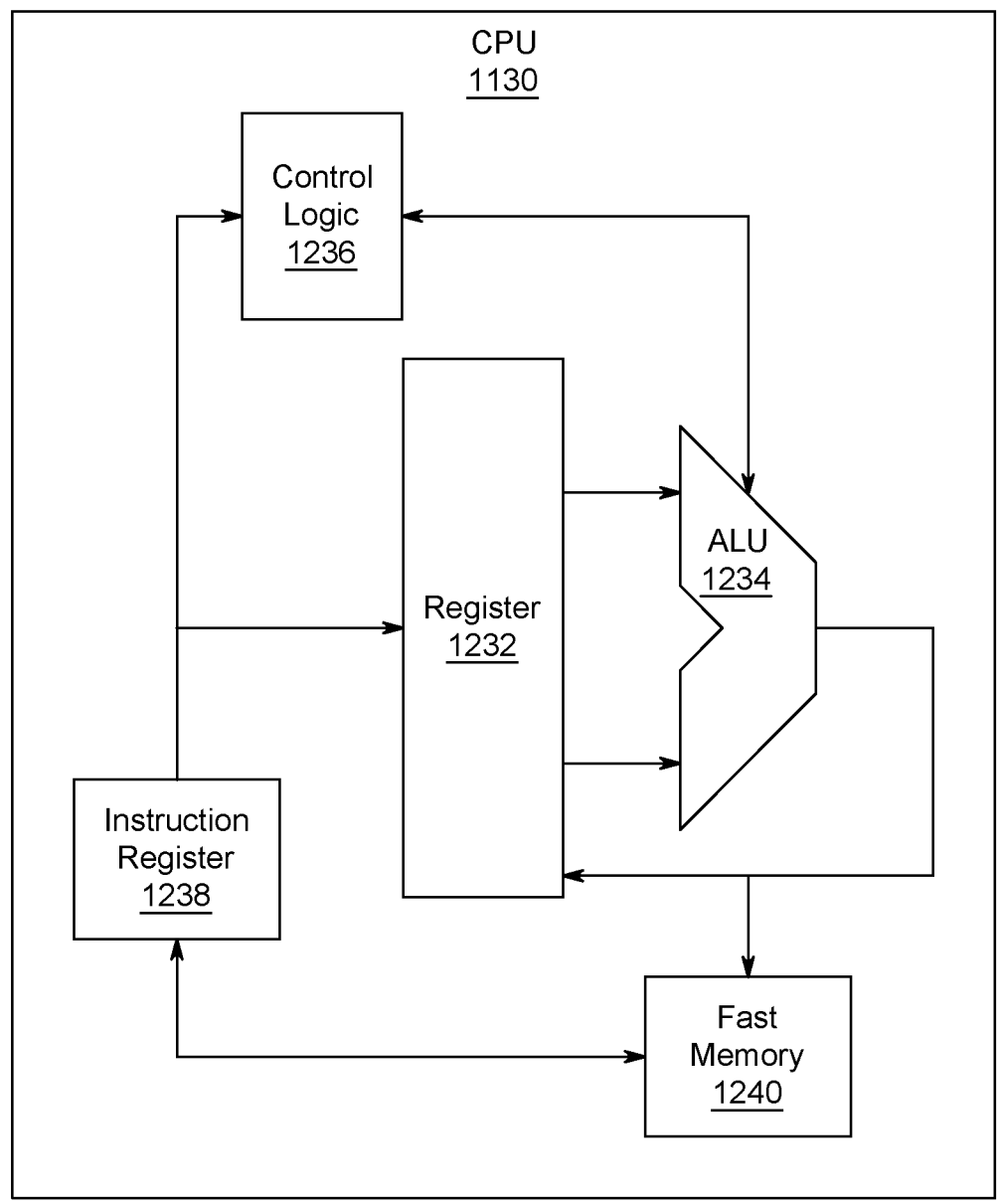
FIG. 12 is an exemplary schematic diagram of a processor used with the computing system, according to certain embodiments.

For example, FIG. 12 shows one implementation of CPU 1130. In one implementation, the instruction register 1238 retrieves instructions from the fast memory 1240. At least one or more parts of these instructions are fetched from the instruction register 1238 by the control logic 1236 and interpreted according to the instruction set architecture of the CPU 1130. Parts of the instructions can also be directed to the register 1232. In one implementation, the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, and/or a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and optical drive 1166 can use, for example, an integrated drive electronics (IDE) or serial advanced technology attachment (SATA) interface. In one implementation the I/O bus can include a super I/O (SIO) device.

Further, the hard disk drive (HDD) 1160 and the optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
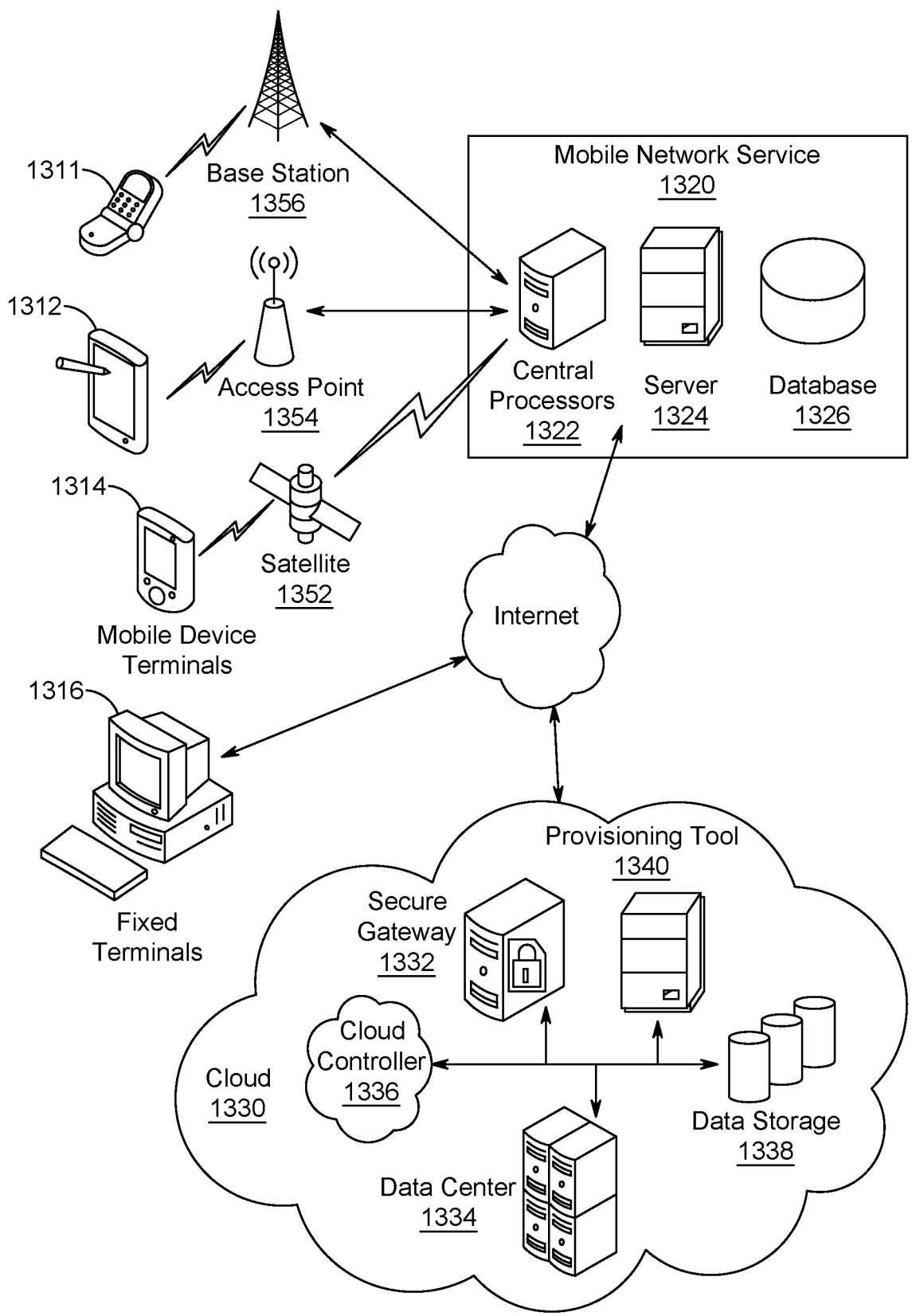
FIG. 13 is an exemplary illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., cell phones 1311, personal digital assistants (PDAs) 1312, smart phones or mobile device terminals 1314, display monitors or fixed terminals 1316, tablets not shown or numbered). The network may be a private network, such as a LAN or WAN, or may be a public network, such as the Internet. Access may be through a satellite 1352, an access point 1354, or base station 1356, to a mobile network service 1320. The mobile network service 1320 can include central processor(s) 1322, server(s) 1324, or database(s) 1326. Input to the system may be received via direct user input and received remotely either in real-time or as a batch process. Back-end processing may be enabled by cloud services 1330, with the aid of one or more of secure gateway 1332, data center 1334, cloud controller 1336, data storage 1338, and/or provisioning tool 1340. Additionally, some implementations may be performed on modules or hardware not identical to those described. Accordingly, other implementations are within the scope that may be claimed.

The above-described hardware description is a non-limiting example of corresponding structure for performing the functionality described herein. Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of controlling a multiple-input and multiple-output (MIMO) wireless network system, wherein the MIMO wireless network system comprises:
    a base station (BS) comprising a plurality number N of antenna elements configured as an array antenna of the BS;
    a plurality number K of mobile stations (MS) each comprising a plurality number M of antenna elements configured as an array antenna of the MS; and
    a controller comprising: a processor; and a memory with a preinstalled program, the controller configured to control an operation of the MIMO wireless network system, wherein
    the BS is configured to modulate a transmit signal $s_k$ directed to a $k^{th}$ MS with a transmit beamformer $w_k$ specified by the controller (k=1 to K), and
    the $k^{th}$ MS is configured to equalize a received signal with a receive beamformer $v_k$ specified by the controller (k=1 to K),
    the method comprising:
    defining a function comprising an outage probability $P_k(w_k, v_k, \gamma)$ at a $k^{th}$ MS (k=1, 2, . . . , or K), wherein the outage probability is defined with the transmit beamformer $w_k$ and the receive beamformer $v_k$ and with a predetermined threshold $\gamma$ of a signal-to-interference-plus-noise ratio (SINR) at the MS;
    formulating a problem of minimizing the function within a predetermined precision level with an identification of minimizing variable(s) and with a constraint on a sum of the norms of the transit beamformer $$\sum_{k=1}^{K} \|w_k\|_2^2$$

being not greater than 1;
    finding a solution set to the problem of minimizing the function, the solution set comprising a transmit beamformer $w_k$ and a receive beamformer $v_k$ (k=1 to K); and
    specifying by the controller based on the solution set, the transmit beamformer $w_k$ and the receive beamformer $v_k$ to be adopted at the BS and at the $k^{th}$ MS (k=1 to K), respectively, wherein in finding the solution set, the outage probability is calculated utilizing a closed form expression of the outage probability, the closed form expression derived based on a Kronecker-structured channel model.

2. The method of claim 1, wherein the closed form expression of the outage probability $P_k(w_k, v_k, \gamma)$ at the $k^{th}$ MS is given by below equations:

$$(w_k, v_k, \gamma) = 1 - \sum_{t=1}^{T} \frac{\lambda_t^T / |\lambda_t|}{\prod_{i=1, i \neq t}^{T}(\lambda_t - \lambda_i)} \exp\left(-\frac{\|v_k\|^2 \sigma_k^2 \gamma}{\lambda_t}\right) u\left(\frac{\|v_k\|^2 \sigma_k^2 \gamma}{\lambda_t}\right), \quad (C1)$$

wherein u(x) represents a unit step function giving 0 for x<0, and 1 for x≥0, and $\lambda_t$ is a $t^{th}$ eigenvalue of A–γB, with Hermitian matrices A and B given below respectively:

$$A = (I_M \otimes \overline{w}_k^T)^H \overline{v}_k^H \overline{v}_k (I_M \otimes \overline{w}_k^T); \text{ and} \quad (C2)$$

$$B = \sum_{i=1,i\neq k}^{K} (I_M \otimes w_i^T)^H \overline{v}_k^H \overline{v}_k (I_M \otimes w_i^T), \quad (C3)$$

wherein $I_M$ represents an identity matrix, the symbol $\otimes$ denotes the Kronecker matrix product.

3. The method of claim 2, wherein the function is a direct utility function minimization (DUFM) comprising:
defining the function with a weighted sum of the outage probabilities $P_k(w_k, v_k, \gamma)$ at the $k^{th}$ MS (k=1 to K); and
formulating the problem of minimizing the function as given below:

$$J_{DUFM} = \min_{\{wk\},\{vk\}} \sum_{k=1}^{K} \zeta_k P_k(\{w_k\}, \{v_k\}, \gamma), \quad (C4)$$

subject to $$\sum_{k=1}^{K} \|w_k\|_2^2 \leq 1, \quad (C5)$$

and $$\Sigma_k \zeta_k = 1, \zeta_k \geq 0, \text{ for all } k, \quad (C6)$$

wherein, $\{w_k\}$ and $\{v_k\}$ denote the transmit beamformer $w_k$ and the receive beamformer $v_k$ (k=1 to K)) as the minimizing variables identified, and $\zeta_k$ denotes a weighting factor.

4. The method of claim 3, wherein the DUFM approach is further comprises a successive approximation method (SAM) in finding the solution set, with the SAM including an algorithm selected from the group consisting of an active set, a sequential quadratic programming, and an interior point.

5. The method of claim 2, wherein the function is a Block-Coordinate Descent Minimization (BCDM) comprising:
setting a precision level;
initializing at a time index i=0;
iterating at a block A with odd iteration numbers (2i+1), (i=0, 1, 2, . . . );
iterating at a block B with even iteration numbers (2i+2); and
stopping iterations when a condition is satisfied,
wherein the initializing comprises:
initializing the transmit beamformer $w_k$ and the receive beamformer $v_k$ as $w_k^o$ and $v_k^o$, (k=1 to K),
defining the function with an outage probability $P_k(w_k, v_k, \gamma)$ at the $k^{th}$ MS, (k=1 to K), and
calculating an initial value of the function as:

$$J_{BCDM,k}^{(0)} = (w_k^o, v_k^o, \gamma), k=1 \text{ to } K, \quad (C7)$$

wherein the iterating at the block A with an odd iteration number (2i+1) comprises:
defining the function with a weighted sum of the outage probabilities $P_k(\{w_k\}, v_k, \gamma)$ (k=1 to K),
formulating the problem of minimizing the function with the transmit beamformers $\{w_k\}$ (k=1 to K) as the minimizing variables identified, with the receive beamformer $v_k$ fixed to a result of a previous step with an iteration number (2i), and with constraints as below;

$$J_{BCDM}^{(2i+1)} = \min_{\{w_k\}} \sum_{k=1}^{K} \zeta_k P_k(\{w_k\}, v_k, \gamma), (i = 0, 1, \ldots,) \quad (C8)$$

subject to $$\sum_{k=1}^{K} \|w_k\|_2^2 \leq 1, \quad (C9)$$

$$\Sigma_k \zeta_k = 1, \zeta_k \geq 0, \text{ for all } k, \quad (C10)$$

$$P_k(\{w_k\}, v_k, \gamma) \leq P_k(\{w_k\}^{2i-1}, v_k, \gamma), \text{ for all } k, \quad (C11)$$

minimizing the function to $J_{BCDM}^{(2i-1)}$ by finding a locally minimizing solution $\{w_k^{lo}\}$ to Eqs. (C8) to (C11), wherein
a) when a reduction from a previous step $$\left( \sum_{k=1}^{K} \zeta_k P_k J_{BCDM,k}^{(2i)} - J_{BCDM}^{(2i+1)} \right)$$

is not smaller than the precision level, the iterating is configured to: update the transmit beamformers $\{w_k\}$ to $\{w_k^{lo}\}$ (k=1 to K); and set a condition 1 as false, or
b) when the reduction is otherwise, the iterating is configured to set the condition 1 as true, without updating the transmit beamformer,
wherein, the iterating at the block B with an even iteration number (2i+2) comprises:
defining the function with an outage probability $P_k(w_k, \{v_k\}, \gamma)$ at the $k^{th}$ MS, (k=1 to K),
formulating the problem of minimizing the function with the receive beamformer $\{v_k\}$ (k=1 to k) as the minimizing variables identified, with the transmit beamformer $w_k$ fixed to a result of a previous step with an iteration number (2i+1), and with constraints as given below:

$$J_{BCDM,k}^{(2i+2)} = \min_{v_k} P_k(w_k, \{v_k\}, \gamma), \text{ for } k = 1 \text{ to } K, \quad (C12)$$

subject to $$P_k(w_k, \{v_k\}, \gamma) \leq P_k(w_k, \{v_k\}^{2i}, \gamma), \text{ for all } k, \quad (C13)$$

wherein, each of the plurality number K of functions is configured to be minimized independently,
minimizing the function to $J_{BCDM,k}^{(2i+2)}$ by finding a locally minimizing solution $\{v_k^{lo}\}$ to Eqs. (C12)-(C13), wherein
a) when a reduction from a previous step $$\left( J_{BCDM}^{(2i+1)} - \sum_{k=1}^{K} \zeta_k J_{BCDM,k}^{(2i+2)} \right)$$

is not smaller than the precision level, the iterating is configured to: update the receive beamformer $\{v_k\}$ to $\{v_k^{lo}\}$ (k=1 to k); and set the condition 2 as false, or b) when the reduction was otherwise, the iterating is configured to set the condition 2 as true without updating the receive beamformer, and wherein the stopping iterations comprises: adopting the transmit beamformers and the receive beamformers most recently updated as the solution set; and stopping the iteration, when the condition 1 and the condition 2 both turn out as true.

6. The method of claim 5, wherein the BCDM further comprises a successive approximation method (SAM) in finding the solution set, with an the SAM including an algorithm selected from the group consisting of an active set, a sequential quadratic programming, and an interior point.

7. The method of claim 2, further comprising a direct multi-objective simultaneous method (DMSM) comprising:
defining the function with the plurality number K of outage probabilities $P_k(\{w_k\}, \{v_k\}, \gamma)$ at the $k^{th}$ MS (k=1 to K),
formulating the problem of minimizing the function with the transmit beamformer $\{w_k\}$ and the receive beamformer $\{v_k\}$ as minimizing variables identified and with constraints, as given below:

$$J_{DMSM}^{(i+1)} = \min_{\{w_k\},\{v_k\}} P_k(\{w_k\}, \{v_k\}, \gamma), (k = 1 \text{ to } K), \quad \text{(C26)}$$

subject to $$\sum_{k=1}^{K} \|w_k\|_2^2 \leq 1, \quad \text{(C27)}$$

$$P_k(\{w_k\},\{v_k\},\gamma) \leq P_k(\{w_k^i\},\{v_k^i\},\gamma), \text{ for all } k, \quad \text{(C28)}$$

wherein $\{w_k^i\}$ and $\{v_k^i\}$ each denotes a transmit beamformer and a receive beamformer for the $k^{th}$ MS updated as a result of an iteration step (i), and wherein the finding the solution set further comprises:
finding a plurality number L of Pareto sub-solutions as expressed below:

$$\{\{P_k(\{w_{l,k}\}, \{v_{l,k}\}, \gamma, l)\}_{k=1}^{K}\}_{l=1}^{L}; \quad \text{(C29)}$$

finding a minimized solution $J_{DMSM}^{(i+1)}$ and corresponding locally minimizing beamformers $\{w_{l,k}^{lo}\}, \{v_{l,k}^{lo}\}$ for each of the Pareto sub-solutions, (k=1 to K);
finding a $l^{th}$ Pareto sub-solution with a maximum Euclidean distance between $J_{DMSM}^{(i)}$ and $J_{DMSM}^{(i+1)}$ with corresponding beamformers $\{w_{l,k}^{lo}\}, \{v_{l,k}^{lo}\}$ of the $J_{DMSM}^{(i+1)}$; wherein)
a) when the maximum Euclidean distance is not smaller than the predetermined precision level, the DMSM is configured to: update the transmit beamformer $\{w_k\}$ and the receive beamformer $\{v_k\}$ by $\{w_{l,k}^{lo}\}$ and $\{v_{l,k}^{lo}\}$, (k=1 to K); set a condition as false; and continue a further iteration step, or
b) when the maximum Euclidean distance is otherwise, the DMSM is configured to: set the condition as true; and adopt most recently updated beamformers $\{w_{l,k}^{lo}\}$ and $\{v_{l,k}^{lo}\}$, (k=1 to K) as the solution set.

8. The method of claim 1, wherein the function is a direct utility function minimization (DUFM) comprising:
defining the function with a weighted sum of the outage probabilities $P_k(w_k, v_k, \gamma)$ at the $k^{th}$ MS (k=1 to K); and
formulating the problem of minimizing the function as given below:

$$J_{DUFM} = \min_{\{wk\},\{vk\}} \sum_{k=1}^{K} \zeta_k P_k(\{w_k\}, \{v_k\}, \gamma); \quad \text{(C4)}$$

subject to $$\sum_{k=1}^{K} \|w_k\|_2^2 \leq 1; \quad \text{(C5)}$$

and $$\Sigma_k \zeta_k = 1, \zeta_k \geq 0, \text{ for all } k, \quad \text{(C6)}$$

wherein, $\{w_k\}$ and $\{v_k\}$ denote the transmit beamformer $w_k$ and the receive beamformer $v_k$ (k=1 to K)) as the minimizing variables identified, and $\zeta_k$ denotes a weighting factor.

9. The method of claim 1, wherein the function is a Block-Coordinate Descent Minimization (BCDM) comprising:
setting a precision level;
initializing at a time index i=0;
iterating at a block A with odd iteration numbers (2i+1), (i=0, 1, 2, . . . );
iterating at a block B with even iteration numbers (2i+2); and
stopping iterations when a condition is satisfied,
wherein the initializing comprises:
initializing the transmit beamformer $w_k$ and the receive beamformer $v_k$ as $w_k^0$ and $v_k^0$, (k=1 to K),
defining the function with an outage probability $P_k(w_k, v_k, \gamma)$ at the $k^{th}$ MS, (k=1 to K), and
calculating an initial value of the function as:

$$J_{BCDM,k}^{(0)} = (w_k^0, v_k^0, \gamma), k=1 \text{ to } K, \quad \text{(C7)}$$

wherein the iterating at the block A with an odd iteration number (2i+1) comprises:
defining the function with a weighted sum of the outage probabilities $P_k(\{_k\}, v_k, \gamma)$ (k=1 to K),
formulating the problem of minimizing the function with the transmit beamformers $\{w_k\}$ (k=1 to K) as the minimizing variables identified, with the receive beamformer $v_k$ fixed to a result of a previous step with an iteration number (2i), and with constraints as below;

$$J_{BCDM}^{(2i+1)} = \min_{\{w_k\}} \sum_{k=1}^{K} \zeta_k P_k(\{w_k\}, v_k, \gamma), (i = 0, 1, \ldots ,) \quad \text{(C8)}$$

subject to $$\sum_{k=1}^{K} \|w_k\|_2^2 \leq 1, \quad \text{(C9)}$$

$$\Sigma_k \zeta_k = 1, \zeta_k \geq 0, \text{ for all } k, \quad \text{(C10)}$$

$$P_k(\{w_k\}, v_k, \gamma) \leq P_k(\{w_k\}^{2i-1}, v_k, \gamma), \text{ for all } k, \quad \text{(C11)}$$

minimizing the function to $J_{BCDM}^{(2i+1)}$ by finding a locally minimizing solution $\{w_k^{lo}\}$ to Eqs. (C8) to (C11), wherein
a) when a reduction from a previous step $$\left(\sum_{k=1}^{K} \zeta_k P_k J_{BCDM,k}^{(2i)} - J_{BCDM}^{(2i+1)}\right)$$

is not smaller than the precision level, the iterating is configured to: update the transmit beamformers $\{w_k\}$ to $\{w_k^{lo}\}$ (k=1 to K); and set a condition 1 as false, or
b) when the reduction is otherwise, the iterating is configured to set the condition 1 as true, without updating the transmit beamformer,
wherein, the iterating at the block B with an even iteration number (2i+2) comprises:
defining the function with an outage probability $P_k(w_k, \{v_k\}, \gamma)$ at the $k^{th}$ MS, (k=1 to K),
formulating the problem of minimizing the function with the receive beamformer $\{v_k\}$ (k=1 to k) as the minimizing variables identified, with the transmit beamformer $w_k$ fixed to a result of a previous step with an iteration number (2i+1), and with constraints as given below:

$$J_{BCDM,k}^{(2i+2)} = \min_{v_k} P_k(w_k, \{v_k\}, \gamma), \text{ for } k = 1 \text{ to } K, \quad (C12)$$

subject to $$P_k(w_k, \{v_k\}, \gamma) \leq P_k(w_k, \{v_k\}^{2i}, \gamma), \text{ for all } k, \quad (C13)$$

wherein, each of the plurality number K of the functions is configured to be minimized independently,
minimizing the function to $J_{BCDM,k}^{(2i+2)}$ by finding a locally minimizing solution $\{v_k^{lo}\}$ to Eqs. (C12)-(C13), wherein
a) when a reduction from a previous step $$\left(J_{BCDM}^{(2i+1)} - \sum_{k=1}^{K} \zeta_k P_k J_{BCDM,k}^{(2i+2)}\right)$$

is not smaller than the precision level, the iterating is configured to: update the receive beamformer $\{v_k\}$ to $\{v_k^{lo}\}$ (k=1 to k); and set the condition 2 as false, or
b) when the reduction was otherwise, the iterating is configured to set the condition 2 as true without updating the receive beamformer, and
wherein the stopping iterations comprises: adopting the transmit beamformers and the receive beamformers most recently updated as the solution set; and stopping the iteration, when the condition 1 and the condition 2 both turn out as true.

10. The method of claim 1, further comprising a direct multi-objective simultaneous method (DMSM) comprising:
defining the function with the plurality number K of outage probabilities $P_k(\{w_k\}, \{v_k\}, \gamma)$ at the $k^{th}$ MS (k=1 to K),
formulating the problem of minimizing the function with the transmit beamformer $\{w_k\}$ and the receive beamformer $\{v_k\}$ as minimizing variables identified and with constraints, as given below:

$$J_{DMSM}^{(i+1)} = \min_{\{w_k\},\{v_k\}} P_k(\{w_k\}, \{v_k\}, \gamma), (k = 1 \text{ to } K), \quad (C26)$$

subject to $$\sum_{k=1}^{K} \|w_k\|_2^2 \leq 1, \quad (C27)$$

$$P_k(\{w_k\},\{v_k\},\gamma) \leq P_k(\{w_k^i\},\{v_k^i\},\gamma), \text{ for all } k, \quad (C28)$$

wherein $\{w_k^i\}$ and $\{v_k^i\}$ each denotes a transmit beamformer and a receive beamformer for the $k^{th}$ MS updated as a result of an iteration step (i),
and wherein the finding the solution set further comprises:
finding a plurality number L of Pareto sub-solutions as expressed below:

$$\{\{P_k(\{w_{l,k}\}, \{v_{l,k}\}, \gamma, l)\}_{k=1}^{K}\}_{l=1}^{L}; \quad (C29)$$

finding a minimized solution $J_{DMSM}^{(i+1)}$ and corresponding locally minimizing beamformers $\{w_{l,k}^{lo}\}$, $\{v_{l,k}^{lo}\}$ for each of the Pareto sub-solutions, (k=1 to K);
finding a $l^{th}$ Pareto sub-solution with a maximum Euclidean distance between $J_{DMSM}^{(i)}$ and $J_{DMSM}^{(i+1)}$ with corresponding beamformers $\{w_{l,k}^{lo}\}$, $\{v_{l,k}^{lo}\}$ of the $J_{DMSM}^{(i+1)}$; wherein
a) when the maximum Euclidean distance is not smaller than the predetermined precision level, the DMSM is configured to: update the transmit beamformer $\{w_k\}$ and the receive beamformer $\{v_k\}$ by $\{w_{l,k}^{lo}\}$ and $\{v_{l,k}^{lo}\}$, (k=1 to K); set a condition as false; and continue a further iteration step, or
b) when the maximum Euclidean distance is otherwise, the DMSM is configured to: set the condition as true; and adopt most recently updated beamformers $\{w_{l,k}^{lo}\}$ and $\{v_{l,k}^{lo}\}$, (k=1 to K) as the solution set.

11. A multiple-input and multiple-output (MIMO) wireless network system, comprising:
a base station (BS) comprising a plurality number N of antenna elements configured as an array antenna of BS;
a plurality number K of mobile stations (MS) each comprising a plurality number M of antenna elements configured as an array antenna of the MS; and
a controller comprising: a processor; and a memory with a preinstalled program,
wherein:
the controller is configured to control an operation of the MIMO wireless network system,
the BS is configured to modulate a signal $s_k$ directed to a $k^{th}$ MS with a transmit beamformer $w_k$ specified by the controller (k=1 to K), and
the $k^{th}$ MS is configured to equalize a received signal with a receive beamformer $v_k$ specified by the controller,
wherein the controller is further configured to:
adopt a definition of a function comprising an outage probability $P_k(w_k, v_k, \gamma)$ at a $k^{th}$ MS;
adopt a formulation of problem of minimizing the function;
find a solution set to the problem of minimizing the function, the solution set comprising a transmit beamformer $w_k$ and a receive beamformer $v_k$ (k=1 to K); and specify based on the solution set, the transmit beamformer $w_k$ and the receive beamformer $v_k$ to be adopted at the BS and at the $k^{th}$ MS (k=1 to K), respectively, wherein the outage probability is defined with the transmit beamformer $w_k$ and the receive beamformer $v_k$ and with a predetermined threshold $\gamma$ of a signal-to-interference-plus-noise ratio (SINR) at the MS, the formulation of a problem comprises a predetermined precision level, an identification of minimizing variable(s) and a constraint, the constraint comprises a sum of the norms of the transit beamformer $$\sum_{k=1}^{K} \|w_k\|_2^2$$

being not greater than 1, and wherein the controller is further configured to calculate the outage probability in finding the solution set utilizing a closed form expression of the outage probability, the closed form expression derived based on a Kronecker-structured channel model.

12. The MIMO wireless network system of claim 11, wherein the closed form expression of the outage probability $P_k(w_k, v_k, \gamma)$ at the $k^{th}$ MS is given by below equations:

$$(w_k, v_k, \gamma) = \qquad (C1)$$
$$1 - \sum_{t=1}^{T} \frac{\lambda_t^T / |\lambda_t|}{\prod_{i=1, i \neq t}^{T}(\lambda_t - \lambda_i)} \exp\left(-\frac{\|v_k\|^2 \sigma_k^2 \gamma}{\lambda_t}\right) u\left(\frac{\|v_k\|^2 \sigma_k^2 \gamma}{\lambda_t}\right),$$

wherein u(x) represents a unit step function giving 0 for x<0, and 1 for x≥0, and $\lambda_t$ is a $t^{th}$ eigenvalue of A−γB, with Hermitian matrices A and B given below respectively:

$$A = (I_M \otimes \overline{w}_k^T)^H \overline{v}_k^H \overline{v}_k (I_M \otimes \overline{w}_k^T); \text{ and} \qquad (C2)$$

$$B = \sum_{i=1, i \neq k}^{K} (I_M \otimes w_i^T)^H \overline{v}_k^H \overline{v}_k (I_M \otimes w_i^T), \qquad (C3)$$

wherein $I_M$ represents an identity matrix, the symbol ⊗ denotes the Kronecker matrix product.

13. The MIMO wireless network system of claim 12, wherein the controller is configured to execute a direct utility function minimization (DUFM) comprising:

defining a function with a weighted sum of the outage probabilities $P_k(w_k, v_k, \gamma)$ at the $k^{th}$ MS (k=1 to K); and formulating a problem of minimizing the function as given below:

$$J = \min_{\{w_k\}, \{v_k\}} \sum_{k=1}^{K} \zeta_k P_k(\{w_k\}, \{v_k\}, \gamma), \qquad (C4)$$

subject to $$\sum_{k=1}^{K} \|\{w_k\}\|_2^2 \leq 1, \qquad (C5)$$

$$\Sigma_k \zeta_k = 1, \zeta_k \geq 0, \text{ for all } k, \qquad (C6)$$

wherein, $\{w_k\}$ and $\{v_k\}$ denote that the transmit beamformer $w_k$ and the receive beamformer $v_k$ (k=1 to K)) are identified as the minimizing variables, and $\zeta_k$ is a weighting factor.

14. The MIMO wireless network system of claim 13, wherein the DUFM executes a successive approximation method (SAM) in finding the solution set, with an algorithm of the SAM selected from a group consisting of an active set, a sequential quadratic programming, and an interior point.

15. The MIMO wireless network system of claim 12, wherein the controller is further configured to execute a block-coordinate descent minimization (BCDM) comprising:

setting a precision level and an algorithm;
initializing at iteration index i=0,
iterating at a block A with odd iteration numbers (2i+1), (i=0, 1, 2, . . . ); and
iterating at a block B with even iteration numbers (2i+2), wherein the initializing is configured to:

initialize the transmit beamformer $w_k$ and the receive beamformer $v_k$ as $w_k^0$ and $v_k^0$, (k=1 to K);
define a function with an outage probability $P_k(w_k, v_k, \gamma)$ at the $k^{th}$ MS, (k=1 to K); and
calculate an initial value of the function as:

$$J_{BCDM,k}^{(0)} = (w_k^0, v_k^0, \gamma), k=1 \text{ to } K, \qquad (C7)$$

wherein the iterating at the block A with an odd iteration number (2i+1) is configured to:

define a function with a weighted sum of the outage probabilities $P_k(\{w_k\}, v_k, \gamma)$ (k=1 to K), formulate the problem of minimizing the function with the transmit beamformers $\{w_k\}$ (k=1 to K) as the minimizing variables identified, with the receive beamformer $v_k$ fixed to a result of a previous step with an iteration number (2i), and with constraints as below;

$$J_{BCDM}^{(2i+1)} = \min_{\{w_k\}} \sum_{k=1}^{K} \zeta_k P_k(\{w_k\}, v_k, \gamma), (i = 0, 1, \dots ,) \qquad (C8)$$

subject to $$\sum_{k=1}^{K} \|w_k\|_2^2 \leq 1, \qquad (C9)$$

$$\Sigma_k \zeta_k = 1, \zeta_k \geq 0, \text{ for all } k, \qquad (C6)$$

$$P_k(\{w_k\}, v_k, \gamma) \leq P_k(\{w_k\}^{2i-1}, v_k, \gamma), \text{ for all } k, \qquad (C13)$$

minimize the function to $J_{BCDM}^{(2i+1)}$ by finding a locally minimizing solution $\{w_k^{lo}\}$ to Eqs. (C8) to (C11), wherein a) when a reduction from a previous step $$\left(\sum_{k=1}^{K} \zeta_k J_{BCDM,k}^{(2i)} - J_{BCDM}^{(2i+1)}\right)$$

is not smaller than the precision level, the iterating is configured to: update the transmit beamformers $\{w_k\}$ to $\{w_k^{lo}\}$ (k=1 to K); and set a condition 1 as false, or b) when the reduction is otherwise, the iterating is configured to set the condition 1 as true, without updating the transmit beamformer, wherein, in iterating at the block B with an even iteration number (2i+2), the function is defined with an outage probability $P_k(w_k, \{v_k\}, \gamma)$ at the $k^{th}$ MS, (k=1 to K), the problem of minimizing the function is formulated with the receive beamformer $\{v_k\}$ (k=1 to k) as the minimizing variables identified, and with constraints as given below:

$$J_{BCDM,k}^{(2i+2)} = \min_{v_k} P_k(w_k, \{v_k\}, \gamma), \text{ for } k = 1 \text{ to } K, \tag{C12}$$

subject to $$P_k(w_k, \{v_k\}, \gamma) \leq P_k(w_k, \{v_k\}^{2i}, \gamma), \text{ for all } k, \tag{C13}$$

wherein, each of the plurality number K of the functions is minimized independently, the transmit beamformer $w_k$ is fixed to a result of the previous step with an iteration number (2i+1), the function is minimized to $J_{BCDM,k}^{(2i+2)}$ by finding a locally minimizing solution $\{v_k^{lo}\}$ to Eqs. (C12)-(C13), and wherein, a) when a reduction from a previous step $$\left( J_{BCDM}^{(2i+1)} - \sum_{k=1}^{K} \zeta_k J_{BCDM,k}^{(2i+2)} \right)$$

is not smaller than the precision level, the iterating is configured to: update the receive beamformer $\{v_k\}$ to $\{v_k^{lo}\}$ (k=1 to k); and set the condition 2 as false, or b) when the reduction was otherwise, the iterating is configured to set the condition 2 as true without updating the receive beamformer, and wherein the stopping iterations comprises: adopting the transmit beamformers and the receive beamformers most recently updated as the solution set; and stopping the iteration, when the condition 1 and the condition 2 both turn out as true.

16. The method of claim 15, wherein the BCDM executes a successive approximation method (SAM) in finding the solution set, with an algorithm of the SAM selected from a group consisting of an active set, a sequential quadratic programming, and an interior point.

17. The MIMO wireless network system of claim 12, wherein the controller is further configured to execute a direct multi-objective simultaneous method (DMSM) comprising:

defining the function with the plurality number K of outage probabilities $P_k(\{w_k\}, \{v_k\}, \gamma)$ at the $k^{th}$ MS (k=1 to K);

formulating the problem of minimizing the function with the transmit beamformer $\{w_k\}$ and the receive beamformer $\{v_k\}$ as minimizing variables identified and with constraints, as given below:

$$J_{DMSM}^{(i+1)} = \min_{\{w_k\},\{v_k\}} P_k(\{w_k\}, \{v_k\}, \gamma), (k = 1 \text{ to } K), \tag{C26}$$

subject to $$\sum_{k=1}^{K} \|w_k\|_2^2 \leq 1, \tag{C27}$$

$$P_k(\{w_k\},\{v_k\},\gamma) \leq P_k(\{w_k^i\},\{v_k^i\},\gamma), \text{ for all } k, \tag{C28}$$

wherein $\{w_k^i\}$ and $\{v_k^i\}$ each denotes a transmit beamformer and a receive beamformer for the $k^{th}$ MS updated as a result of an iteration step (i), finding a plurality number L of Pareto sub-solutions as expressed below:

$$\{\{P_k(\{w_{l,k}\}, \{v_{l,k}\}, \gamma, l)\}_{k=1}^{K}\}_{l=1}^{L}; \tag{C29}$$

finding a minimized solution $J_{DMSM}^{(i+1)}$ and corresponding locally minimizing beamformers $\{w_{l,k}^{lo}\}$, $\{v_{l,k}^{lo}\}$ for each of the Pareto sub-solutions, (k=1 to K);

finding a $l^{th}$ Pareto sub-solution with a maximum Euclidean distance between $J_{DMSM}^{(i)}$ and $J_{DMSM}^{(i+1)}$ with corresponding beamformers $\{w_{l,k}^{lo}\}$, $\{v_{l,k}^{lo}\}$ of the $J_{DMSM}^{(i+1)}$, and wherein the DMSM is configured to:

a) update the transmit beamformer $\{w_k\}$ and the receive beamformer $\{v_k\}$ with $\{w_{l,k}^{lo}\}$ and $\{v_{l,k}^{lo}\}$, (k=1 to K); set a condition as false; and to continue a further iteration step, when the maximum Euclidean distance is not smaller than the predetermined precision level, or b) adopt most recently updated beamformers $\{w_{l,k}^{lo}\}$ and $\{v_{l,k}^{lo}\}$, (k=1 to K) as the solution set; set the condition as true; and to stop the iteration step, when the maximum Euclidean distance is otherwise.

18. The MIMO wireless network system of claim 11, wherein the controller is configured to execute a direct utility function minimization (DUFM) comprising:

defining a function with a weighted sum of the outage probabilities $P_k(w_k, v_k, \gamma)$ at the $k^{th}$ MS (k=1 to K); and formulating a problem of minimizing the function as given below:

$$J_{DUFM} = \min_{\{w_k\},\{v_k\}} \sum_{k=1}^{K} \zeta_k P_k(\{w_k\}, \{v_k\}, \gamma); \tag{C4}$$

subject to $$\sum_{k=1}^{K} \|w_k\|_2^2 \leq 1; \tag{C5}$$

and $$\Sigma_k \zeta_k = 1, \zeta_k \geq 0, \text{ for all } k, \tag{C6}$$

wherein, $\{w_k\}$ and $\{v_k\}$ denote the transmit beamformer $w_k$ and the receive beamformer $v_k$ (k=1 to K)) as the minimizing variables identified, and $\zeta_k$ denotes a weighting factor.

19. The MIMO wireless network system of claim 11, wherein the controller is further configured to execute a block-coordinate descent minimization (BCDM) comprising:

setting a precision level and an algorithm;
initializing at iteration index i=0,
iterating at a block A with odd iteration numbers (2i+1), (i=0, 1, 2, . . . ); and
iterating at a block B with even iteration numbers (2i+2),
wherein the initializing is configured to:
  initialize the transmit beamformer $w_k$ and the receive beamformer $v_k$ as $w_k^0$ and $v_k^0$, (k=1 to K);
  define a function with an outage probability $P_k(w_k, v_k, \gamma)$ at the $k^{th}$ MS, (k=1 to K); and
  calculate an initial value of the function as:

$$J_{BCDM,k}^{(0)} = (w_k^0, v_k^0, \gamma), k = 1 \text{ to } K, \tag{C7}$$

wherein the iterating at the block A with an odd iteration number (2i+1) is configured to:
  define a function with a weighted sum of the outage probabilities $P_k(\{w_k\}, v_k, \gamma)$ (k=1 to K),
  formulate the problem of minimizing the function with the transmit beamformers $\{w_k\}$ (k=1 to K) as the minimizing variables identified, with the receive beamformer $v_k$ fixed to a result of a previous step with an iteration number (2i), and with constraints as below;

$$J_{BCDM}^{(2i+1)} = \min_{\{w_k\}} \sum_{k=1}^{K} \zeta_k P_k(\{w_k\}, v_k, \gamma), (i = 0, 1, \ldots,) \tag{C8}$$

subject to $$\sum_{k=1}^{K} \|w_k\|_2^2 \leq 1, \tag{C9}$$

$\Sigma_k \zeta_k = 1, \zeta_k \geq 0$, for all $k$, (C10)

$P_k(\{w_k\}, v_k, \gamma) \leq P_k(\{w_k\}^{2i-1}, v_k, \gamma)$, for all $k$, (C11)

minimize the function to $J_{BCDM}^{(2i+1)}$ by finding a locally minimizing solution $\{w_k^{lo}\}$ to Eqs. (C8) to (C11),
wherein
a) when a reduction from a previous step $$\left( \sum_{k=1}^{K} \zeta_k J_{BCDM,k}^{(2i)} - J_{BCDM}^{(2i+1)} \right)$$

is not smaller than the precision level, the iterating is configured to: update the transmit beamformers $\{w_k\}$ to $\{w_k^{lo}\}$ (k=1 to K); and set a condition 1 as false, or
b) when the reduction is otherwise, the iterating is configured to set the condition 1 as true, without updating the transmit beamformer,
wherein, in iterating at the block B with an even iteration number (2i+2),
  the function is defined with an outage probability $P_k(w_k, \{v_k\}, \gamma)$ at the $k^{th}$ MS, (k=1 to K),
  the problem of minimizing the function is formulated with the receive beamformer $\{v_k\}$ (k=1 to k) as the minimizing variables identified, and with constraints as given below:

$$J_{BCDM,k}^{(2i+2)} = \min_{v_k} P_k(w_k, \{v_k\}, \gamma), \text{ for } k = 1 \text{ to } K, \tag{C12}$$

subject to $P_k(w_k, \{v_k\}, \gamma) \leq P_k(w_k, \{v_k\}^{2i}, \gamma)$, for all $k$, (C11)

wherein, each of the plurality number K of the functions is minimized independently, the transmit beamformer $w_k$ is fixed to a result of the previous step with an iteration number (2i+1),
the function is minimized to $J_{BCDM,k}^{(2i+2)}$ by finding a locally minimizing solution $\{v_k^{lo}\}$ to Eqs. (C12)-(C13),
wherein
a) when a reduction from a previous step $$\left( J_{BCDM}^{(2i+1)} - \sum_{k=1}^{K} \zeta_k J_{BCDM,k}^{(2i+2)} \right)$$

is not smaller than the precision level, the iterating is configured to: update the receive beamformer $\{v_k\}$ to $\{v_k^{lo}\}$ (k=1 to k); and set the condition 2 as false, or
b) when the reduction was otherwise, the iterating is configured to set the condition 2 as true without updating the receive beamformer, and
wherein the stopping iterations comprises: adopting the transmit beamformers and the receive beamformers most recently updated as the solution set; and stopping the iteration, when the condition 1 and the condition 2 both turn out as true.

20. The MIMO wireless network system of claim 11, wherein the controller is further configured to execute a direct multi-objective simultaneous method (DMSM) comprising:
  defining the function with the plurality number K of outage probabilities $P_k(\{w_k\}, \{v_k\}, \gamma)$ at the $k^{th}$ MS (k=1 to K);
  formulating the problem of minimizing the function with the transmit beamformer $\{w_k\}$ and the receive beamformer $\{v_k\}$ as minimizing variables identified and with constraints, as given below:

$$J_{DMSM}^{(i+1)} = \min_{\{w_k\},\{v_k\}} P_k(\{w_k\}, \{v_k\}, \gamma), (k = 1 \text{ to } K), \tag{C26}$$

subject to $$\sum_{k=1}^{K} \|w_k\|_2^2 \leq 1, \tag{C27}$$

$P_k(\{w_k\}, \{v_k\}, \gamma) \leq P_k(\{w_k^i\}, \{v_k^i\}, \gamma)$, for all $k$, (C28)

wherein $\{w_k^i\}$ and $\{v_k^i\}$ each denotes a transmit beamformer and a receive beamformer for the $k^{th}$ MS updated as a result of an iteration step (i),
finding a plurality number L of Pareto sub-solutions as expressed below:

$$\{\{P_k(\{w_{l,k}\}, \{v_{l,k}\}, \gamma, l)\}_{k=1}^{K}\}_{l=1}^{L}; \tag{C29}$$

finding a minimized solution $J_{DMSM}^{(i+1)}$ and corresponding locally minimizing beamformers $\{w_{l,k}^{lo}\}$, $\{v_{l,k}^{lo}\}$ for each of the Pareto sub-solutions, (k=1 to K);

finding a $l^{th}$ Pareto sub-solution with a maximum Euclidean distance between $J_{DMSM}^{(i)}$ and $J_{DMSM}^{(i+1)}$ with corresponding beamformers $\{w_{l,k}^{lo}\}$, $\{v_{l,k}^{lo}\}$ of the $J_{DMSM}^{(i+1)}$, and wherein the DMSM is configured to:
a) update the transmit beamformer $\{w_k\}$ and the receive beamformer $\{v_k\}$ with $\{w_{l,k}^{lo}\}$ and $\{v_{l,k}^{lo}\}$, (k=1 to K); set a condition as false; and to continue a further iteration step, when the maximum Euclidean distance is not smaller than the predetermined precision level, or
b) adopt most recently updated beamformers $\{w_{l,k}^{lo}\}$ and $\{v_{l,k}^{lo}\}$, (k=1 to K) as the solution set; set the condition as true; and to stop the iteration step, when the maximum Euclidean distance is otherwise.

* * * * *